United States Patent [19]
Soliman et al.

[11] Patent Number: 6,111,857
[45] Date of Patent: Aug. 29, 2000

[54] WIRELESS NETWORK PLANNING TOOL

[76] Inventors: Samir S. Soliman, 11412 Cypress Canyon Park Dr., San Diego, Calif. 92131; Sheila M. Reynolds, 1036 Devonshire Dr., Encinitas, Calif. 92024

[21] Appl. No.: 08/929,297

[22] Filed: Sep. 11, 1997

Related U.S. Application Data

[63] Continuation of application No. 08/535,999, Sep. 29, 1995, Pat. No. 5,710,758.

[51] Int. Cl.$^7$ ............................. H04B 17/00; H04Q 7/34
[52] U.S. Cl. ........................................... 370/254; 370/335
[58] Field of Search ..................................... 370/244, 254, 370/318, 320, 329, 342, 335; 455/422, 423, 445, 446, 450, 456, 457, 67.1, 67.2, 67.6; 375/202; 395/183.08, 183.09

[56] References Cited

U.S. PATENT DOCUMENTS

| | | | |
|---|---|---|---|
| 4,881,082 | 11/1989 | Graziano | 342/432 |
| 5,270,919 | 12/1993 | Blake et al. | 340/827 |
| 5,293,640 | 3/1994 | Gunmar et al. | 455/446 |
| 5,307,510 | 4/1994 | Gunmar et al. | 455/67.1 |
| 5,410,736 | 4/1995 | Hoque | 455/33.1 |
| 5,428,817 | 6/1995 | Yahagi | 455/33.1 |
| 5,490,285 | 2/1996 | Ahlenius et al. | 455/33.1 |
| 5,491,837 | 2/1996 | Haartsen | 455/33.1 |
| 5,497,412 | 3/1996 | Lannen | 455/33.1 |
| 5,517,503 | 5/1996 | Hess | 370/95.1 |
| 5,519,884 | 5/1996 | Duque-Anton et al. | 455/450 |
| 5,561,841 | 10/1996 | Markus | 455/446 |
| 5,610,839 | 3/1997 | Karolak et al. | 375/202 |

OTHER PUBLICATIONS

"The Cellular Concept", *The Bell System Technical Journal*, by V.H. MacDonald, vol. 58, No. 1, Jan. 1979, pp. 15–41.

"Mobile Location Using Signal Strength Measurements in a Cellular System", *IEEE Transactions on Vehicular Technology*, by Masher Hatter et al., vol. VT–29, No. 2, May 1980, pp. 245–252.

"Cellular System Design Using the Expansion Cell Layout Method", *IEEE Transactions on Vehicular Technology*, by J. Douglas Wells, vol. VT–33, No. 2, May 1984, pp. 58–66.

"C–900—An Advanced Mobile Radio Telephone System with Optimum Frequency Utilization", *IEEE Transactions on Vehicular Technology*, by Karl Kammerlander, vol. VT–33, No. 3, Aug. 1984, pp. 205–213.

"Traffic Model and Performance Analysis for Cellular Mobile Radio Telephone Systems with Prioritized and Nonprioritized Handoff Procedures", *IEEE Transactions on Vehicular Technology*, by Daehyoung Hong et al., vol. VT–35, No. 3, Aug. 1986, pp. 77–92.

(List continued on next page.)

*Primary Examiner*—Chi H. Pham
*Assistant Examiner*—Kwang B. Yao
*Attorney, Agent, or Firm*—Russell B. Miller; Christopher O. Edwards; Brian S. Edmonston

[57] ABSTRACT

A novel and improved method and apparatus for planning a wireless telecommunications network. An electronic representation of wireless telecommunications system can be configured within a given market area and the operation of that wireless telecommunications system simulated. The simulation is performed using a set of databases that contain terrain and population information associated with the market area over which the wireless network in configured. To perform the simulation a composite propagation loss matrix and a demand and service vector are generated using the terrain and population information, as well as the configuration of the wireless telecommunications network. Once the composite propagation loss matrix and the demand and service vector are generated an analysis of the reverse link is performed. Subsequently, an analysis of the forward link is performed. During both the reverse and forward link analysis the multiple iterations of analysis are performed until a stable result is achieved. Upon completion of the reverse and forward link analysis, the results of the simulation are displayed in a graphical manner for examination.

8 Claims, 18 Drawing Sheets

OTHER PUBLICATIONS

"Multiple Criteria for Hand–Off in Cellular Mobile Radio", *IEEE Proceedings*, by D. Munoz–Rodriguez, vol. 134, Pt. F, No. 1, Feb. 1987, pp. 85–88.

Excerpt from U.S. patent Official Gazette, Jun. 2, 1987, p. 608.

Excerpt from U.S. Patent Official Gazette, Sep. 29, 1987, p. 2631.

IEEE Article, Entitled "Hand–Off Procedure for Fuzzy Defined Radio Cells", by D. Munoz–Rodriguez et al, Sep. 1987, pp. 38–44.

Excerpt from U.S. patent Official Gazette, Feb. 2, 1988, p. 403.

"Efficient Hand–off policy Without Guard Channels for Mobile Radio Telephone Systems", *Electronics Letters*, by P. Billet et al., May 25, 1989, vol. 25, No. 11, pp. 700–701.

"Priority Oriented Channel Access for Cellular Systems Serving Vehicular and Portable Radio Telephones", *IEEE Proceedings,*, by D. Hong, vol. 136, Pt. I, No. 5, Oct. 1989. pp. 339–346.

"A New Channel Assignment Scheme in Demand–Assignment Radio Communications System", *Electronics and Communications in Japan*, by Jun Tajima, Part 1, vol. 72, No. 8, 1989, pp. 41–50.

"CDMA Radio Network Planning", *IEEE*, Radio Systems Department GTE Laboratories, by Mark Wallace et al. Sessions 1.3 & 1.4, pp. 62–67.

Brochure Excerpt, from LCC Inc., referencing CellCAD, 2 pages.

Brochure Excerpt, from CNET, referencing Wings (Wireless Network Graphics System), 2 pages.

Article entitled, "Efficient Spectrum Utilization for Mobile Radio Systems Using Space Diversity", by Y.S. Yeh et al, of Bell Laboratories, pp. 12–16.

WIRELESS NETWORK PLANNING TOOL

This is a Continuation of application Ser. No. 08/535,999 filed Sep. 29, 1995, now U.S. Pat. No. 5,710,758.

BACKGROUND OF THE INVENTION

I. Field of the Invention

The present invention relates to wireless network design. More particularly, the present invention relates to a method of simulating and analyzing the operation of a code division multiple access (CDMA) wireless telecommunications network.

II. General Background of the Invention

Network planning requires an estimation of system requirements in light of expected future load characteristics. A computer based network planning tool is one convenient means of network planning. The network planning tools for analog and digital wireless frequency division communication systems are often quite different from planning tools used for spread spectrum based communication systems. Frequency division systems, such as implemented in time division multiple access (TDMA), frequency division multiple access (FDMA) and automatic mobile phone service (AMPS), need sophisticated frequency planning methods. A typical frequency planning method used in these systems will ensure that each individual user is given a distinct frequency when communicating through the same base station receiver unit. In addition, a frequency assigned to one user on a first base station can only be reused on a nearby base station if it does not interfere with neighboring base stations transmission requirements.

More sophisticated network planning tools are required when the underlying communication system is more complex. Sophisticated spread-spectrum digital communication systems, like CDMA, have increased the quality of communication as well as increased the complexity of the network. Unlike planning tools used for the previously mentioned digital and analog, spread spectrum systems have very complex analysis requirements. A spread spectrum system utilizing a wide-band communication scheme, like CDMA, will require specialized planning tools which take into account transmission characteristics related to analog signals as well as the various digital modulation methods implemented. A brief comparison of a spread spectrum system, like CDMA, with other traditional wireless communication methods should make the increased level of complexity apparent.

Unlike a spread spectrum communication, the traditional multiple access system utilizes exclusive resource allocation methods. An exemplary exclusive resource allocation method will provide a frequency or a time slot, or a combination thereof, which is disjoint from those of any other user. This method may be found in analog, such as AMPS and digital, such as TDMA, wireless communication methods. Assuming each transmission occurs in perfect isolation from all the other users, the multiple access channel may be typified as a multiplicity of single point-to-point channels. The capacity of each of these point-to-point channels usually is limited only by the bandwidth, noise degradation, multi-path fading and shadowing effects.

The bulk of traditional network planning methods, therefore, is concerned with estimating the likelihood these point-to-point channels will be available. The availability of a channel at any moment, in turn, depends primarily on limitations of frequency reuse. Frequency reuse requires a network planner to allocate a finite number of frequencies amongst base stations as associated coverage areas in such a manner that reused frequencies are out of range of other nearby cells. The traditional network planning tool only needs to estimate signal loss to determine if a proper network constellation will function. The analysis is complete once the planning tool has determined all coverage areas transmitting at the same frequency are far enough apart that signal interference will not occur.

A hard capacity limit also restricts users in a traditional system due to an absolute limit of frequencies available. A subscriber unit attempting to communicate over an analog system, such as AMPS, or particular digital systems, such as TDMA, faces hard capacity limit. This hard limit depends on the number of frequencies available at a particular coverage area. A typical analog system has fifty seven analog FM channels in a three-sector coverage area. When demand for service is at a peak, the fifty-eighth caller in a given cell must be given a busy signal. Similarly, when a call in progress must hand-off and all adjacent coverage areas are full this subscriber call will likely be dropped when the signal strength waxes and the no handoff is possible.

The analysis methods found in a traditional network planning tool are static despite the dynamic nature of communication. These methods can not take in account a sudden increase in users or interference caused by unexpected electromagnetic transmissions. In practice, when these unaccounted for events occur a traditional network will respond by denying users service and a loss in signal quality. Clearly, the simplicity of such traditional systems and their respective planning tools has been obtained at the expense of system integrity. As will be seen, wideband wireless systems, like CDMA, take in account many dynamic factors and as a result have much more complex methods of analysis.

In a wideband system, like CDMA, there is a much softer relationship between the number of users and the grade of service. The grade of service (GOS) is an index which measures the likelihood a call will be dropped or service refused. Variation of the GOS in a wideband system may vary in proportion to the number of users but is not bounded by the hard capacity limits found in narrow-band systems. This is because the wideband system allocates all resources to all users simultaneously. Available bandwidth is maximized using sophisticated coding techniques which provide a resilient transmission medium impervious to cross-talk caused in traditional wireless methods previously mentioned.

The capacity of a wideband system is limited only by the ability to decode the transmitted signal. Each user communicating sends an message encrypted with a pseudo-random code which is decrypted by the receiving base station. As the number of users increase at a base station, the probability that the receiving base station will decrypt the code accurately decreases. A system operator could decide to allow a small degradation in the bit error rate and increase the number of available channels during peak hours. Therefore, a spread spectrum communication planning tool must determine the serviceable number of users depending on the quality of transmission selected, the projected number of simultaneous users and the corresponding interference during the decoding stages.

Power consumption and control is another unique area of planning required by a spread spectrum system. To achieve high capacity, the wideband system employs power control methods on both the forward link, from a base station to a subscriber unit, and reverse link, from a subscriber unit to a base station. The objective of the reverse link power control process is to require that each base station need only receive nominal signal power. When all the subscriber station transmitters within the coverage of a base station are so controlled, then subscriber unit energy is conserved and less noise and interference results. The forward link power, though practically not finite, must be adjusted to include only those subscriber units which are capable of returning a like signal. Matching the forward link power with the nominal reverse link power insures a complete communication link from the forward link and back over the reverse link is possible. A planning tool for a wideband communication system must be able to determine numerous system power levels as a function of dynamic variables like user load and signal interference.

SUMMARY OF THE INVENTION

The present invention is a novel and improved method and apparatus for planning a code division multiple access wireless telecommunications network. An electronic representation of wireless telecommunications system can be configured within a given market area and the operation of that wireless telecommunications system simulated. The simulation is performed using a set of databases that contain terrain and population information associated with the market area over which the wireless network in configured. To perform the simulation a composite propagation loss matrix and a demand and service vector are generated using the terrain and population information. Once the propagation loss matrix and the demand and service vector are generated an analysis of the reverse link is performed. Subsequently, an analysis of the forward link is performed. During both the reverse and forward link analysis the multiple iterations of analysis are performed until a stable result is achieved. Upon completion of the reverse and forward link analysis, the results of the simulation are displayed in a graphical manner for examination.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 18 is a flow chart illustrating the steps performed during calculation of the forward link effective radiated power from each base station performed in accordance with one embodiment of the invention;

DETAILED DESCRIPTION OF THE PREFERRED EMBODIMENTS

A method of simulating and analyzing the operation of a CDMA wireless network is described. In the following description, various processing "steps" are set forth. In the preferred embodiment of the invention these steps constitute the manipulation of voltages, currents, and electromagnetic signals via the use of semiconductor integrated circuits, as well as the control of those semiconductor circuits via the use of such voltages, currents, and electromagnetic signals. Also, throughout the application the use of various processing loops during which it is determined whether the last base station, location, or coordinate has been processed is described. The generation of such loops will be obvious to one skilled in the art, and the details of there operation are omitting in order to avoid unnecessarily obscuring the disclosure of the present invention.

Figure 1:
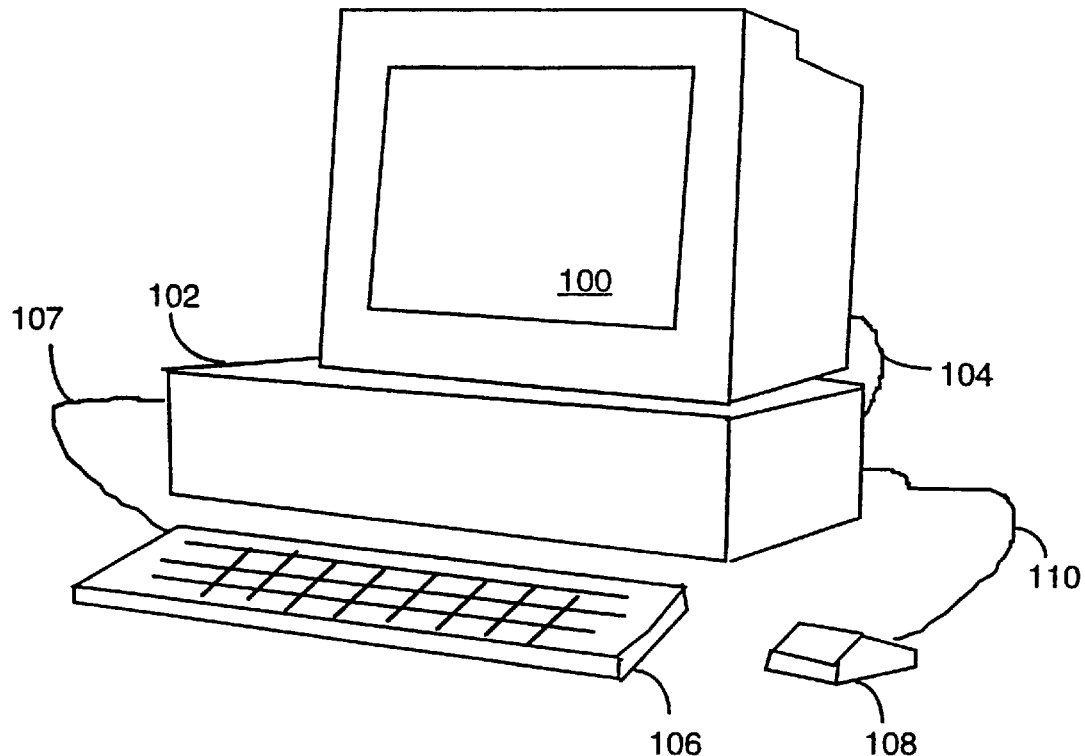
FIG. 1 is an illustration of a computer system configured in accordance with one embodiment of the invention.

FIG. 1 is an illustration of a computer system used to implement the present invention in accordance with the exemplary embodiment described herein. Display screen 100 is coupled to computer 102 via cable 104 and in the preferred embodiment of the invention incorporates the use of a cathode ray tube display mechanism, however, the use of other display mechanisms will be apparent including the use of transistor based flat panel displays or image projection devices. Display screen 100 is divided into pixels that are set to various colors by computer 102 in order to display an image. In the preferred embodiment of the invention the pixels are arranged in an X-Y coordinate system, and are square or rectangular in shape. Keyboard 106 is coupled to computer 102 via cable 107, and mouse 108 is coupled to computer 102 via cable 110. Keyboard 106 and mouse 108 generate electronic signals in response to manipulation by a user that are input to computer 102. It will be apparent to one skilled in the art that various other input mechanism may be used in lieu of or in addition to mouse 108 and keyboard 106 including pen and tablet devices, track ball units, and speech recognition systems.

Figure 2:
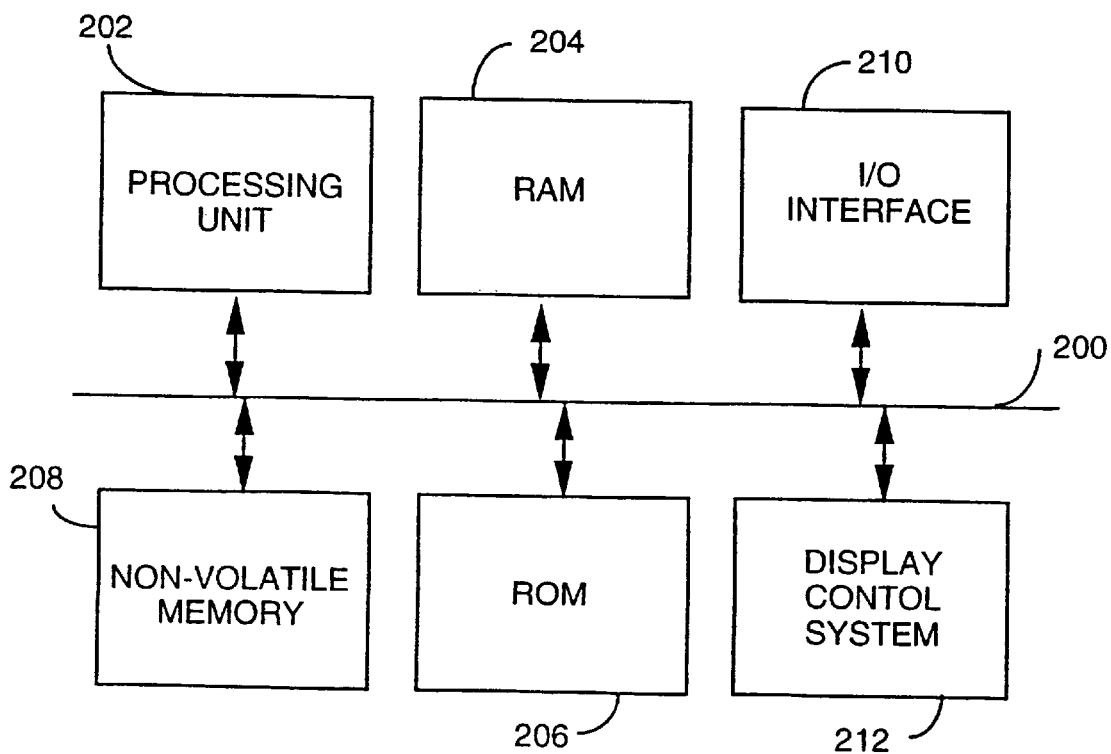
FIG. 2 is a block diagram of a computer system configured in accordance with one embodiment of the invention.

FIG. 2 is a block diagram of computer 102 when configured in accordance with one embodiment of the invention. Bus 200 couples together processing unit 202, random access memory (RAM) 204, read only memory (ROM) 206, non-volatile memory 208, input-output (I/O) interface 210, and display control system 212. Using digital instructions stored in non-volatile memory 208, and RAM 204, processing unit 202 processes digital data also stored in non-volatile memory 208 and RAM 204, as well as received from I/O interface 210, which is coupled to keyboard 106 and mouse 108 of FIG. 1, as well as any other input devices. As a result of this processing, processing unit 202 generates data that is useful for planning a wireless network and that is provided to display control system 212 which in turn causes the data to be displayed on display screen 100 of FIG. 1 for viewing purposes. In the preferred embodiment of the invention, processing unit 202, random access memory (RAM) 204, read only memory (ROM) 206, non-volatile memory, 208, input-output (I/O) interface 210, and display control system 212, incorporate the use of semiconductor based integrated circuits. Non-volatile memory 208 also incorporates the use of magnetic or optical memory disk, either removable or non-removable, although other storage devices well known in the art may be substituted. Additionally, the data and instructions are preferably comprised of stored electronic charges, voltages, electromagnetic signals, or a combination thereof, as well as electromagnetic or optical particles arraigned in a predetermined and controlled fashion.

The data stored in non-volatile memory includes an electronic representation of the geographic and other environmental information about a specific market area over which simulation of the operation of a wireless telecommunications system is to be performed. In the preferred embodiment of the invention this data is stored as altitude (height) and attribute information (terrain data) associated with an evenly spread set of X-Y coordinates referred to as "bins". Additionally, the stored data includes an electronic representation of the layout of a wireless telephone system. Various methods for generating both the terrain data area and wireless telephone system layout will be apparent including measuring existing geographical areas and wireless telephone systems or manual entry using keyboard 106 and mouse 108. Additionally, a preexisting electronic representation of the configuration of a wireless telephone system can also be saved and imported into computer system 99 via a storage disk or network connection. During operation of the network planning tool the software instructions stored within the memory system cause the processing system 102 to generate images on display screen 100 using the data stored in non-volatile memory 208 or RAM 204, or both, as well as the electronic signals generated using mouse 108 and keyboard 106. Instructions and data may also be provided to computer 102 and processing unit 202 via a network connection, the use of which is also well known in the art.

Figure 3:
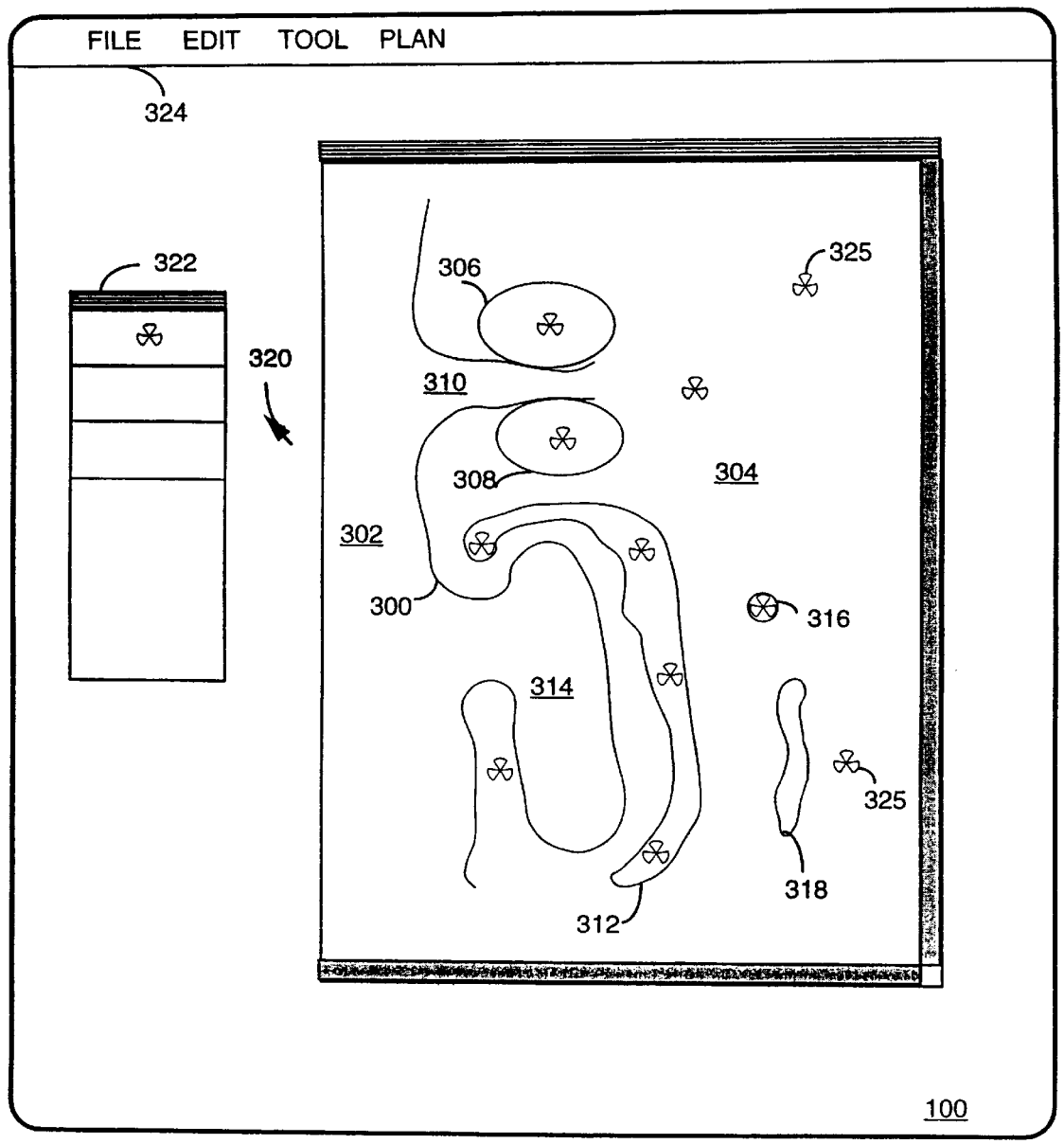
FIG. 3 is an illustration of an image displayed in accordance with on embodiment of the invention.

FIG. 3 is an illustration of an exemplary image displayed on display screen 100 using the terrain data stored in non-volatile memory 208 in accordance with one embodiment of the invention. Shore line 300 indicates the separation between water body 302 and land area 304. Hills 306 and 308 are displayed on either side of inlet 310, and ridge 312 surrounds bay region 314. Hill 316 and canyon 318 are located to the right of ridge 312. Pointing cursor 320 can be moved across the display using mouse 108 of FIG. 1 and is used to select base station placement tool from tool palette 322 depression of a selection button (not shown) on mouse 108. Additionally, pointing cursor 320 is used to make selections from menu bar 324 the use of which is well known in the art. Various parameters mentioned throughout the application are entered by the user via the use of menu bar 324 and dialog boxes (not shown) that contain fields into which the parameters are entered by typing on keyboard 106, or via selection using mouse 108. It should be understood that the geographic landscape shown is only provided for purposes of example, and the display of other market areas are consistent with the operation of the present invention. For example, a market area that did not have a body of water, or with a fewer or greater number of hills could also be displayed. Additionally, the market area displayed could correspond to an actual geographic region or could be merely a fictitious region, or a combination thereof.

Base stations 325 are located as shown and in the preferred embodiment of the invention and may by placed and moved by manipulating mouse 108 such that pointing cursor 320 is located in the desired location an pressing the select button located on mouse 108. Each base station provides a bi-direction radio frequency interface to a set of locations referred to as the coverage area of that base station. A subscriber unit, which usually takes the form of a wireless or cellular telephone, situated at a particular location conducts voice and wireless connections via the use of this radio frequency interface. One skilled in the art will recognize a variety of alternative methods for placing base stations 325 including alternative use of the selection button and inputting the desired coordinates via keyboard 106. Once the base station locations have been established a simulation may performed and the results of the simulation are displayed on display screen 100. The results may be displayed in various ways by setting the pixels of display screen 100 to various colors or shades, or both, in a manner that indicates at least a portion of the results generated. In one example of such a display a pixel is set to a particular color depending on the number of phone calls and other communications being conducted from that location via the use of base stations 525(a)–(e). In another example the pixels associated with a location in communication with one base station 325 are set to one color or shade, the pixels associated with a location in communication with two base stations 325 are set to another color or shade, and the pixels associated with a location in communication with three base stations 325 are still to another color or shade. In still another example, pixels associated with a location that receive wireless phone service are altered in a first predetermined manner, while other pixels remain unaltered, or are altered in a second predetermined manner.

Figure 4:
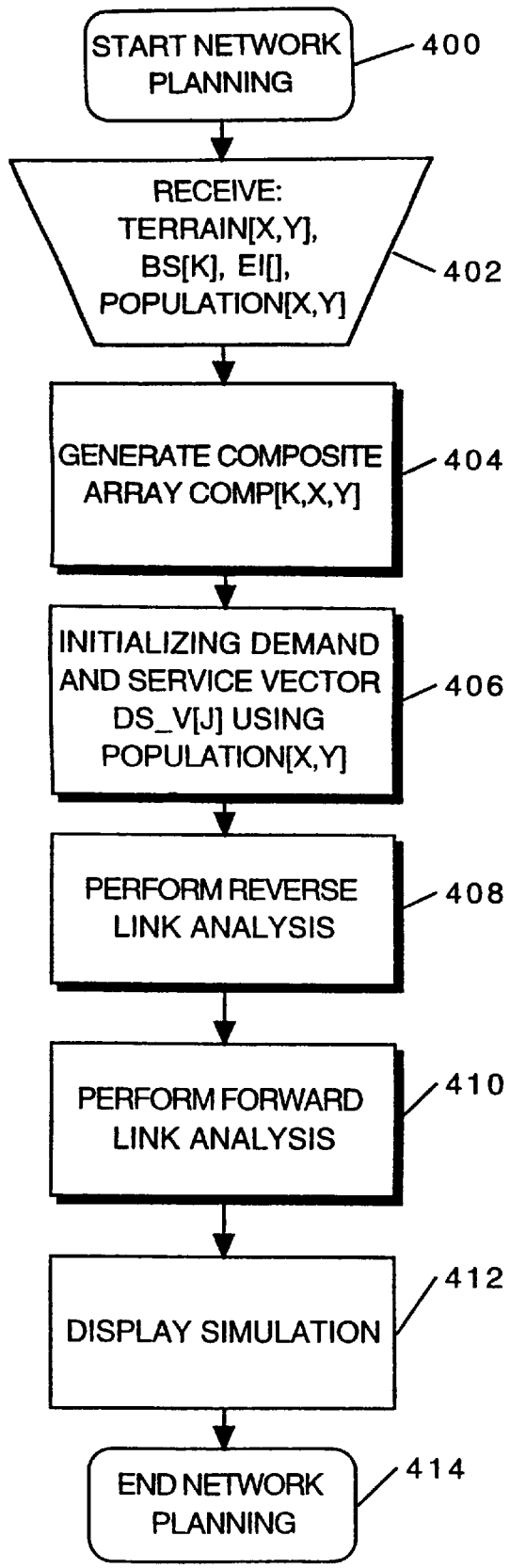
FIG. 4 is a flow chart illustrating the steps performed during the simulation of the operation of a wireless telecommunications network when performed in accordance with one embodiment of the invention.

FIG. 4 is a flow chart illustrating the operations performed by computer 100 during the course of a simulation in accordance with the preferred embodiment of the invention. The network planning beings at step 400 and at step 402 terrain data (TERRAIN[X][Y]), a base station database and associated location information (BS[K]), and population information (POPULATION[X][Y]) are received. As noted above in the preferred embodiment of the invention such information is generated before the simulation is performed either via measurement or from preexisting data bases. The terrain data consists of the vertical height of the market area over which the simulation is being performed organized in X-Y coordinate form. The base station database consists of the number of base station, the X-Y location for each base station, and the vertical height of the base station antenna, which is a parameter that can by set by the user or stored in a preconfigured data base. At step 404 a composite propagation loss array (COMP[K][X][Y]) is generated using the terrain and base station information. The composite propagation loss array contains the propagation loss from each base station 325 (FIG. 3) to an associated set of locations that fall within a given radius of each base station 325. The size of the radius used is a parameter that can be set by the user. At step 406, a demand and service vector (DS_V[I]) is initialized using the population information. In the preferred embodiment of the invention the demand and service vector is a single dimension array that contains the expected demand for wireless telecommunications service at the various locations within the market over which the simulation is being performed, and the generation of the demand and service will be described in greater detail below.

At step 408 a reverse link analysis is performed. The reverse link is the transmission of data from a subscriber unit to a base station via the use of radio frequency (RF) signals modulated in accordance with code division multiple access techniques. In the preferred embodiment, the signals are modulated in accordance with the IS-95 and IS-95A TIA standard (Telecommunications Industry Association, 2001 Pennsylvania Avenue, N.W., Washington, D.C. 20006), the use of which is well known. The analysis of the reverse link determines which locations within the demand and service vector will be able to establish a reverse link connection with a base station 325, and therefore be able to receive wireless telecommunications service, given the total expected demand of the market area and the configuration of the base stations provided. Additionally, the final analysis of the reverse link will determine to which base station 325 each reverse link connection is made. The results of these determinations will be stored within the demand and service vector. At step 410, an analysis of the forward link is performed. A forward link signal is the transmission of data from a base station 325 to a subscriber unit via an RF signal. The analysis of the forward link determines the set of locations within the market area that are able to establish forward link connections. This determination is stored in the base station database, as well as in a forward link array (FL[ ][ ][ ]) discussed in more detail below. At step 412 the results of the simulation are displayed on display screen 100 (FIG. 1) in one of a variety of manners that may be chosen by the user. In the preferred embodiment of the invention the results of the simulation are also stored in non-volatile memory 102 (FIG. 1) so that they may be recalled at a later time or shared with other users. At step 414 the processing associated with the network planning is terminated.

Figure 5:
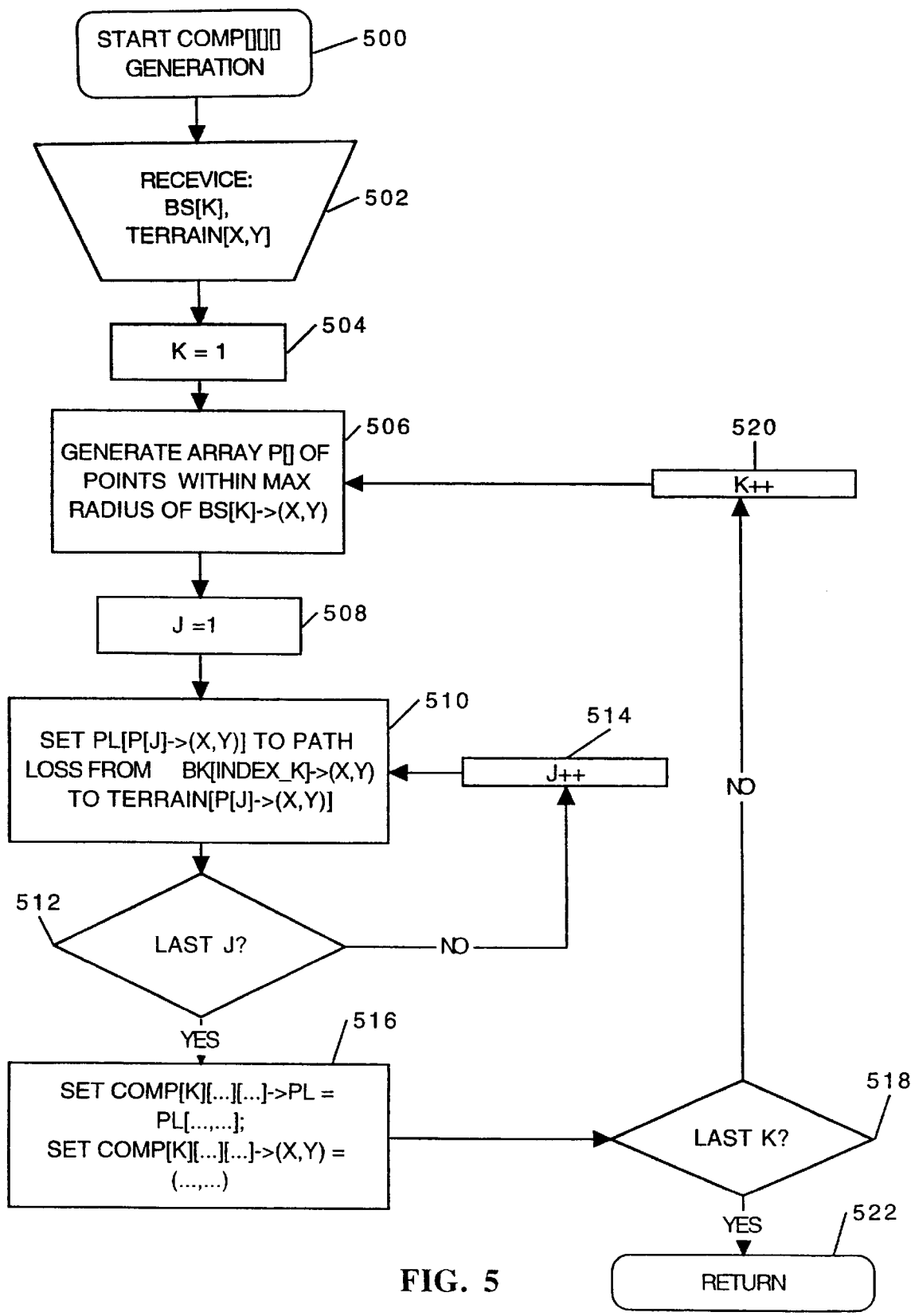
FIG. 5 is a flow chart illustrating the steps performed during generation of the composite propagation loss matrix when performed in accordance with one embodiment of the invention.

FIG. 5 is a flow chart illustrating the steps involved with the generation of the composite propagation loss matrix in accordance with one embodiment of the invention. The propagation loss is the amount of loss a radio frequency signal will experience a signal is emitted from a subscriber station at a given location to an antenna at a given base station. Since many of the calculations involved with the forward and reverse link analysis depend on the propagation loss between a location and a base station, the initial calculation and storage of all the propagation loss values between each base station 325 and a set of associated location within a given radius of that base station 325 facilitates and accelerates any subsequent analysis. The generation of the composite propagation loss matrix beings at step 500 and at step 502 the base station database and the terrain data are received. At step 504 the index variable K is set to '1' and at step 506 an array C[ ] (for circle) is generated containing the X and Y locations of every location within the terrain map located within the given radius of the base station 325 in location BS[K]. The X-Y location stored within a given location is indicated by the convention C[ ]→(X,Y), which will be familiar to those skilled in the art. The X-Y location of the base station is indicated by BS[K] →(X,Y). At step 508 the index variable J is set to '1' and at step 510 the memory location within propagation loss array PL[ ][ ] specified by P[J]→(XY) is set to the propagation loss from the base station 325 specified by BS[K]→(X,Y) and to the location specified by TERRAIN[C[J]→(X,Y)], which is the location currently being processed. The method by which the propagation loss is calculated will be discussed below. At step 512 it is determined if the last point within the array C[ ] has been processed, and if not J is incremented at step 514 and the propagation loss associated with the next point is processed at step 510. If the last point within array C[ ] has been processed, the contents of propagation loss array PL[ ][ ] are copied to the propagation loss locations within composite matrix (COMP[K][ ][ ]→PL) at step 516. At step 518 it is determined if the index variable K corresponds to last base station has been processed, and if not the index variable K is incremented at step 520 and a new array C[ ] is generated with respect to next base station 325 indicated by BS[K]. If it is determined at step 518 that the last base station has been processed, the generation of the composite propagation loss matrix is terminated at step 522. It should be noted, that the area associated with a base station may be divided into sectors, by calculating multiple non-circular sets of points for each base station, and determining the propagation loss within each sector that belongs to the base station.

Figure 6:
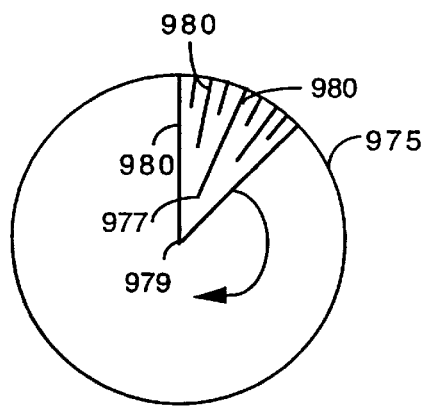
FIG. 6 is an illustration of the order of processing the locations surrounding a base station in accordance with one embodiment of the invention.

In the preferred embodiment of the invention the generation of the propagation loss data performed in step 710 is accomplished by processing each location within array C[ ] in a predefined order illustrated by FIG. 6. Circle 975 defines the area stored in array C[ ]. The data within array C[ ] is organized into a set of radials 980 that protrude outwardly from base station location 979 to the edge 975 of the circle defined by the given radius. Some radials 980 are longer than the others because fewer locations are available close to base station location 979 as dictated by simple geometry. During processing a free space loss calculation is performed for each location, and if the location is not in the line of sight of the base station, a diffraction loss calculation is also performed, and the total propagation loss is set to the sum of the free space loss plus the diffraction loss.

Figure 7:
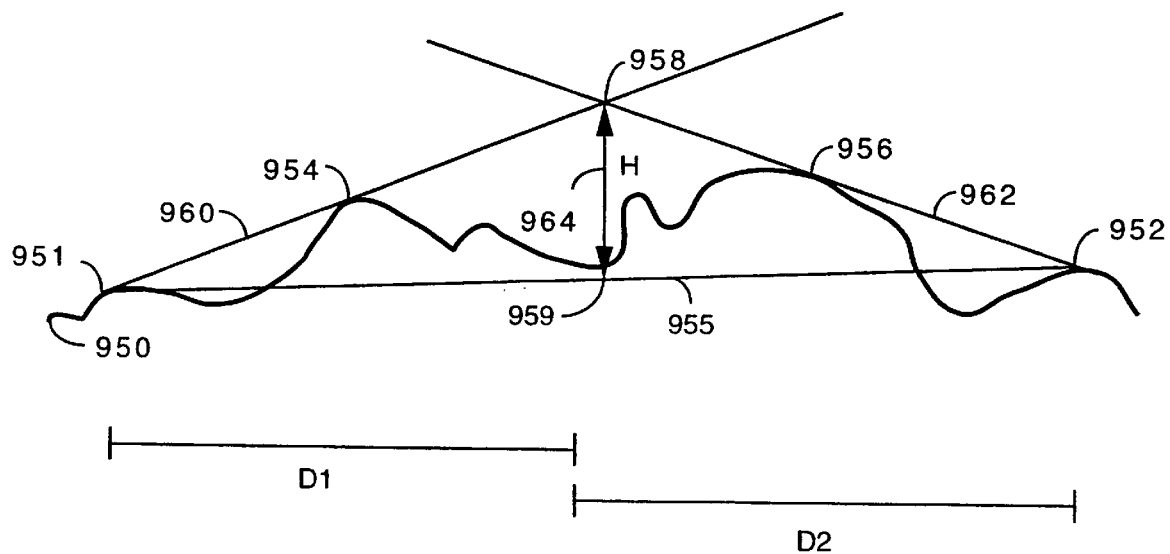
FIG. 7 is a side view illustration of landscape provided in order to facilitate discussion of the diffraction loss calculation performed in accordance with one embodiment of the invention.

The generation of the diffraction loss value for a location associated with a particular radial is illustrated in FIG. 7. Line 950 represents the side view of the landscape on which selected point 951 and point 952 being processed are located. First edge 954 is the point highest on the landscape in view of center point 951 (i.e. the point on landscape 950 from which a line drawn to selected point 951 has the highest slope), and last edge 956 is the highest point on the landscape in view of point 952. First edge 954 and last edge 956 are identified by determining the locations on landscape 950 from which lines 960 and 962 drawn to selected point 951 and point 952, respectively, have the greatest slope in accordance with the calculation of such slopes as described for the line of sight cursor provided above. To calculate the diffraction loss, location 958 where line 960 and line 962 intersect is first identified and a line 955 drawn from selected point 951 to point 952 is generated. Using point 958 and line 955, a height H is set to correspond to minus the length of line 964 drawn directly downward from point 958 to point 959 on line 955, and distance D1 from point 951 to point 959 and distance D2 from point 959 to point 952 are determined. Using location distances H, D1 and D2, which were calculated using selected point 951, first edge 954, last edge 962, and point 952, a diffraction loss is calculated as follows:

$$v = H \times \sqrt{\frac{2}{\lambda} \times \left[\frac{1}{D_1} + \frac{1}{D_2}\right]} \quad (1)$$

Where H is a negative number, $\lambda$ equals the wavelength of the radio frequency signals being transmitted and:

If $v<-2.4$, diffraction loss$=-20\times\log_{10}(-0.225/v)$ (2)

If $-2.4 < v < 1.0$, (3)

$$\text{diffraction loss} = -20 \times \log_{10}\left[0.4 - \sqrt{0.1184 - (0.1v + 0.38)^2}\right]$$

If $-1.0<v<0.0$, diffraction loss$=-20\times\log_{10}[0.5\times e^{0.92v}]$ (4)

Those skilled in the art will recognize that the above provided calculation is a standard diffraction loss equation well known in the art. If only one edge exists between selected point 951 and location being processed 952, H is set to minus the distance of that edge to line 955. The free space loss is calculated using the following equation:

$$\text{Free Space Loss} = 20\log\left(\frac{4\pi D}{\lambda}\right) \quad (5)$$

Where D is the distance on the ground from point 951 to point 952. As noted above, for a locations that are in the line of sight of one another, the free space loss equation is used alone. Whether a location is in the line of sight of the base station is determined by calculating the slope of a line from each location along the radial to the base station antenna, and determining if, for each location, another location exists closer to the base station along the radial having a greater slope. If such a location exists, the location being processed is not in the line of sight of the base station antenna, and a non line of sight propagation loss calculation is performed. Otherwise the line of sight propagation loss calculation is performed. The determination as to whether a particular location has a direct line of sight view to the base station and the calculation of the propagation loss amount is described in greater detail in copending U.S. patent application Ser. No. 08/515,772 entitled "GRAPHIC TOOLS FOR INTERACTIVELY PLANNING A WIRELESS NETWORK" filed on Aug. 16, 1995 and assigned to the assignee of the present invention incorporated herein by reference. It should be noted that, although not shown, the height of the antenna at both the location being processed and at the base station included in the height parameter during each calculation.

Various other methods of calculating the propagation loss between two point that either have or do not have direct line of sight view to the selected location will be apparent to one skilled in the art. The methods of calculation provided above are merely one example of performing such calculations, and the use of these other methods are constant with the operation of the present invention. However, the methods of calculation provided above are especially useful in that they provide an ideal level of accuracy for display on a typical computer display screen while consuming a minimal amount of computer resources and development time.

Figure 8:
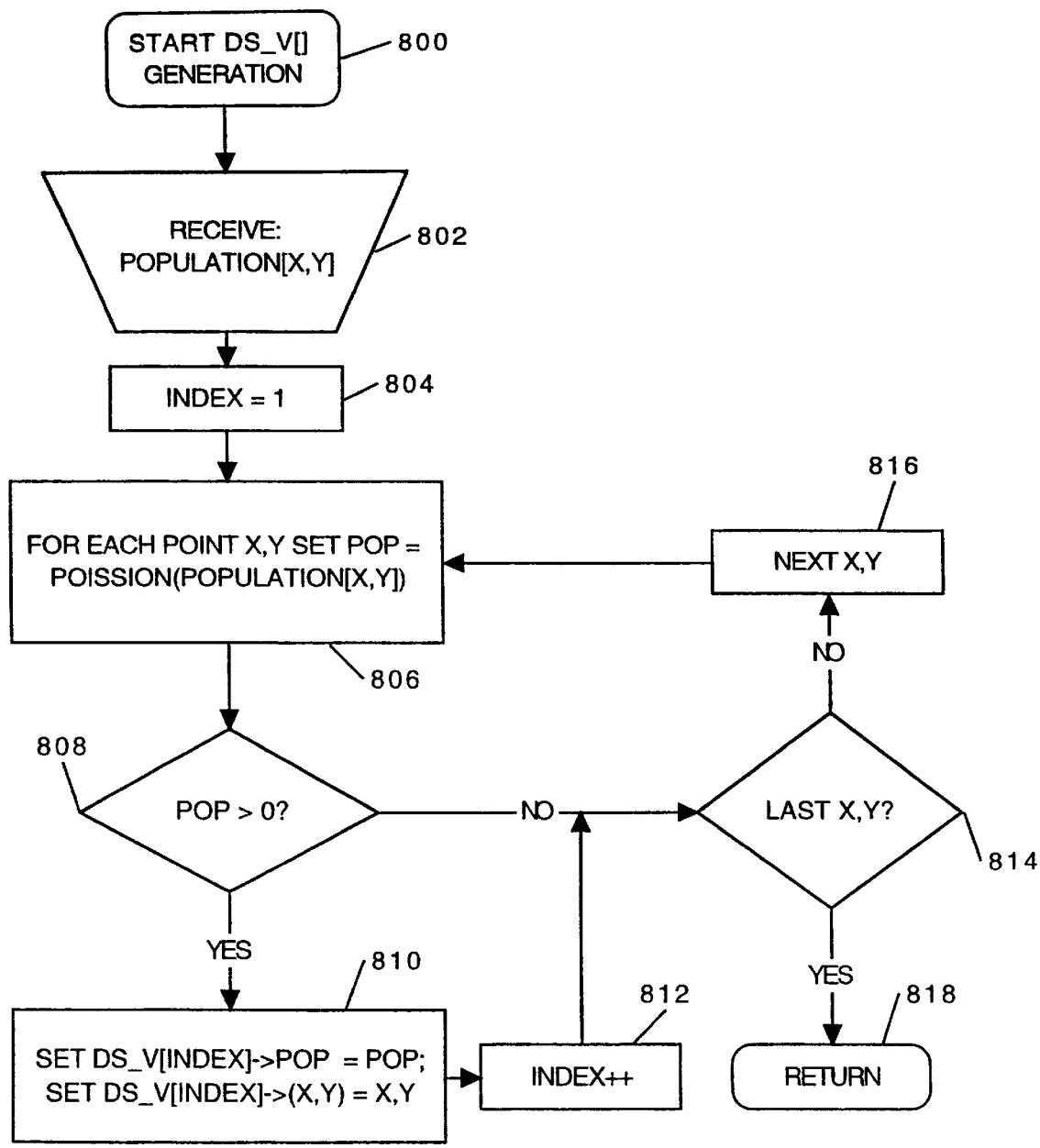
FIG. 8 is a flow chart illustrating the steps performed during initialization of the demand and service vector when performed in accordance with one embodiment of the invention.

FIG. 8 is a flow diagram illustrating the steps involved with the generation of the demand and service vector DS_V[ ] as shown in step 406 of FIG. 4. As noted above, the demand and service vector is a single dimension array the contains the expected demand for wireless telecommunications service at the various locations within the market over which the simulation is being performed. The generation of the demand and service vector begins at step 800 and at step 802 the population information is received. At step 804 the variables INDEX, X and Y are set to 1, and at step 806 a Poisson random variable generation function is performed on the population at the location (X,Y) and the resulting value stored in the variable POP. The Poisson random variable generation function calculates a probability function based of the population at location X,Y and generates a pseudo random whole number based on that probability. The use of a Poisson function to determine the demand for wire based telecommunications service is well known. At step 808 it is determined if the resulting pseudo random number is equal greater than zero, and if so the value along with the associated (X,Y) coordinates are stored within the demand service vector at location INDEX during step 810. At step 812 the variable index is incremented. If the resulting pseudo random number stored in the variable POP is determined to be equal to zero at step 810, it is determined at step 814 whether the last (X,Y) coordinates have been processed, and if not (X, Y) is set to the next coordinate to be processed, and the generation of a new pseudo random number is performed at step 806. Those skilled in the art will recognize the various ways in which an entire grid of (X,Y) coordinate pairs may be cycled through. If at step 814 it is determined that the last (X,Y) coordinate pair has been processed, the generation of the demand service vector will be termination at step 816.

The generation of a demand and service vector in the above described manner both improves the speed with which the remaining portion of the simulation is performed, and reduces the computer resources necessary to perform the processing associated with that simulation. This is because each time the application of the Poisson function is performed a zero value may result, especially in less populated regions of the market area. When a zero results, no memory is necessary to store the value and no additional calculations need to be performed with regard to that location, since no demand for telephone service will be made. In sparsely populated area were the number of people per bin is a very small number, the number of locations being assigned a value of zero will be high. Therefore the simulation will proceed more rapidly in these areas via the use of the Poisson calculated values. Because the Poisson calculated values are generated with a probability determined in accordance with the actual population associated with a particular bin, however, the demand for telephone service calculated for each base station using the Poisson generated populations will still accurately represent the actual demand. Therefore the simulation can be performed with far less memory and with fewer calculation that if performed on the actual population information.

Figure 9:
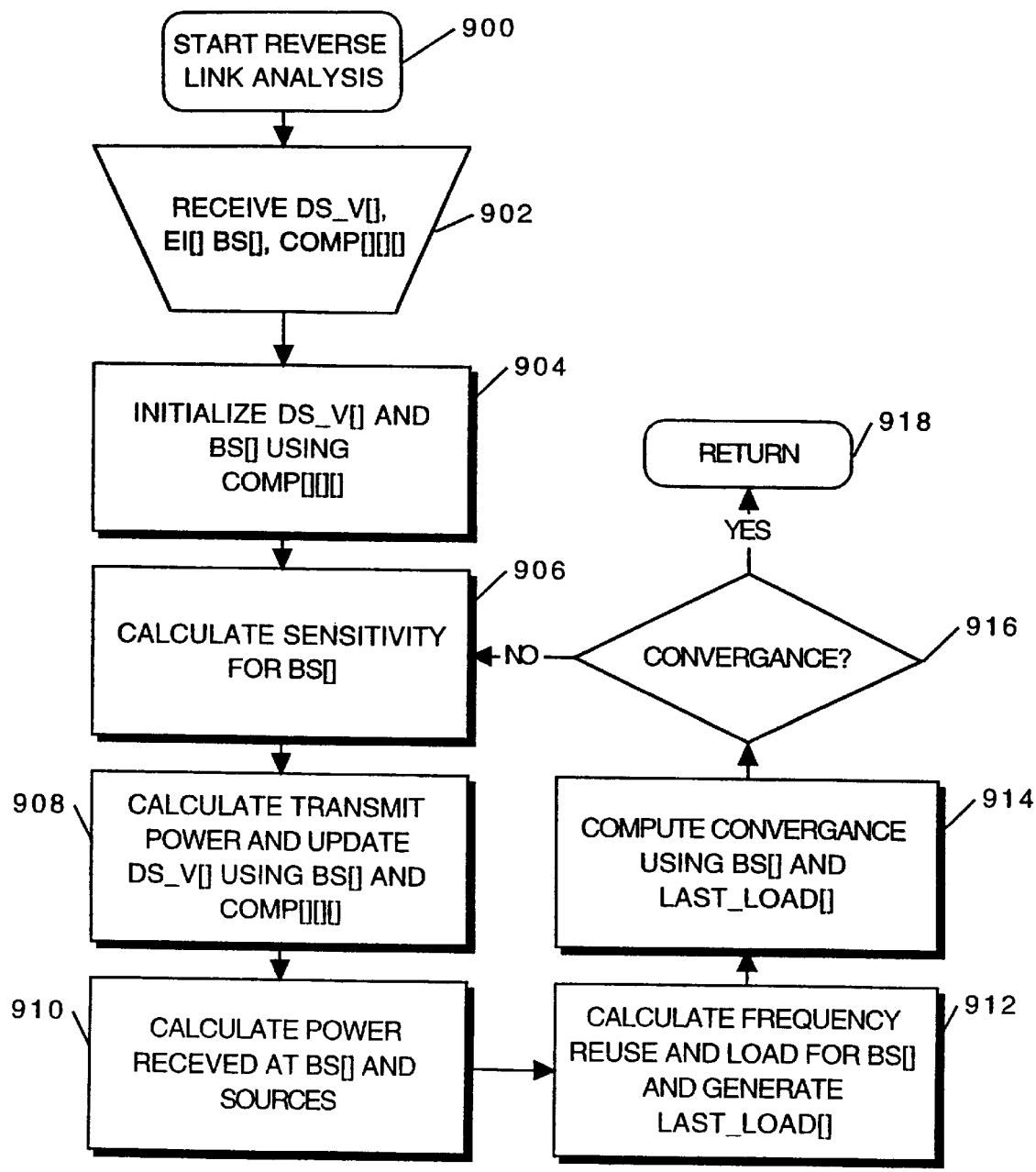
FIG. 9 is a flow chart illustrating the steps performed during the analysis of the reverse link connection when performed in accordance with one embodiment of the invention.

FIG. 9 is a flow diagram illustrating the steps involved with the analysis of the reverse link as indicated by step 608 of FIG. 6. At step 900 the reverse link analysis begins and at step 902 the demand and service vector, the base station database and the composite propagation loss matrix are received. At step 904 the demand service vector the base station database are initialized using composite propagation loss matrix. The initialize is performed by assigning the locations within the demand and service vector to the base station within the base station database to which the smallest propagation loss exists. This process is explained in more detail below. At step 906 the sensitivity of each base station is calculated using the initial value generated in step 904. The sensitivity is the minimum signal strength that can be detected by a base station 325. At step 908 the amount of power transmitted from each location in the demand and service vector in order to close a reverse link connection is calculated using the base station database and the composite propagation loss matrix, and at step 910 the amount of power received at each base station in response to these reverse link transmissions is calculated using the demand and service vector and the composite propagation loss matrix. At step 912 the frequency reuse and the load for each base station is calculated, and the array last load (LAST_ LOAD[ ]) is generated which stores the amount of load associated with each base station before the load calculation was performed. At step 914 the convergence is computed as a function of the difference between the values in last load and the present values is compared by among of change incurred during the previous execution of step 912, and if at step 916 it is determined that the convergence was achieved the reverse link analysis is terminated at step 918. If convergence is determined to have not been achieved at step 916, the calculations are performed again starting at step 906.

Before proceeding with the discussion of the various steps performed during each stage of the reverse link simulation, many of the various assumptions made during that simulation should be explained. The reverse link analysis estimates the power associated with each reverse link transmission by determining the minimum amount of power necessary for subscriber at a particular location to transmit an acceptable signal to a base station. It is assumed that the minimum amount of power is used because of the sophisticated power control capabilities provided by the IS-95 wireless telecommunications system simulated in the preferred embodiment of the invention. Calculating the minimum amount of power associated with each reverse link transmission, in turn, depends on a variety of other parameters. One such parameter is the ratio of the energy per information bit to the total noise spectral density Eb/Nt required at the base station.

Eb/Nt is derived from the associated target frame error rate (FER), and depends on the ability of the base station to demodulate the received signal and an exemplary value for this is 6 dB. Another set of such parameter is the voice activity factor Vr, which is calculated as a function of voice activity probabilities $P_{v1}$, $P_{v2}$, $P_{v3}$, and $P_{v4}$, which are the probabilities of a subscriber transmission occurring with full, half, quarter, and eighth rate respectively. Another parameter is the reference noise temperature T, used to compute background noise $N_0$=kT where k=Boltzman's constant. An exemplary value for T is 290° Kelvin. Still another such parameter is the CDMA bandwidth W [Hz] of the RF signals used to transmit information. An exemplary bandwidth for CDMA is 1.2288 $10^6$ Hz. Finally, another parameter used to determined the energy associated with a reverse link signal is the traffic channel full data rate Rb (bps). An exemplary Rb is value is 14,400 bps.

The voice activity factor Vr may vary according to the nature of conversation being transmitted and the particular language characteristics of the population in the market. In an exemplary embodiment utilizing a variable rate vocoder, as is the common practice in digital wireless telephone systems, higher voice activity tends to create more mutual interference than lower voice activity. As noted above, the voice activity factor is based on four probabilities: voice transmission at full rate $P_{v1}$, half rate $P_{v2}$, quarter rate $P_{v3}$, and eighth rate $P_{v4}$. Typical values for these probabilities are 0.2911, 0.3880, 0.0724, and 0.5977 respectively, which yields an overall voice activity factor of 0.4033 when used in the following formula:

$$v_r = P_{v1} + \frac{P_{v2}}{2} + \frac{P_{v4}}{4} + \frac{P_{v8}}{8} \tag{6}$$

In the preferred embodiment of the invention the overall voice activity factor is used in conjunction with the composite propagation loss information to make an initial estimate for required reverse link energy per bit to the total noise power $E_b/N_t$. The energy per bit to the total noise power $E_b/N_t$ measures the required received power from a subscriber to a base station k. As noted above, it is assumed that the power control is ideal, and therefore that each reverse link signal is transmitted with the minimum amount of power necessary for it to be detected by the receiving base station. The energy per bit to the total noise power $E_b/N_t$ can be described as:

$$\frac{E_o}{N_1} = \frac{\frac{S(k)}{R_b}}{N_o N_f^c(k) + \frac{N_u(k)}{F_r(k)} v_r \frac{S(k)}{W}} \tag{7}$$

where:

$S(k)$    Sensitivity of sector $k$: minimum received power at base station sector $k$ for a signal transmitted from a subscriber to a base station.

$N_f^c(k)$    Base station noise figure: an amplifier characteristic which provides the effective noise from amplifier when multiplied by background noise $N_0$.

-continued $\dfrac{N_u(k)}{F_r(k)}$ Normalized number of users: represents the combined effect of the effective number of users from within base station $k$ and all other base station. The normalization factor $F_r(k)$ is also known as the frequency reuse efficiency.

The sensitivity S(k) can be derived from equation (7) and may be adjusted to receive a particular quality of communication. The sensitivity of base station S(k) as calculated during the reverse link analysis may be expressed as:

$$S(k) = \dfrac{(N_o W) N_f^c(K)}{\dfrac{W/R}{E_O/N_t} - \dfrac{N_u(k) v_r}{F_r(k)}} \qquad (8)$$

As can be seen, sensitivity is a function of the normalized number of users. The normalized number of users, however, is a function of the sensitivity of each base station. For example, the number of subscribers associated with a base stations will depend on the sensitivity of that base station, with a base station having a greater sensitivity being more likely to establish a reverse link connection. Conversely, as the number of subscribers in reverse link increases, the amount of power received at that base station also increases and the sensitivity is increased. Thus, a recursive relationship is created. Therefore, in order to perform the reverse analysis multiple iterations must be performed, until a stable solution is achieved.

Figure 10:
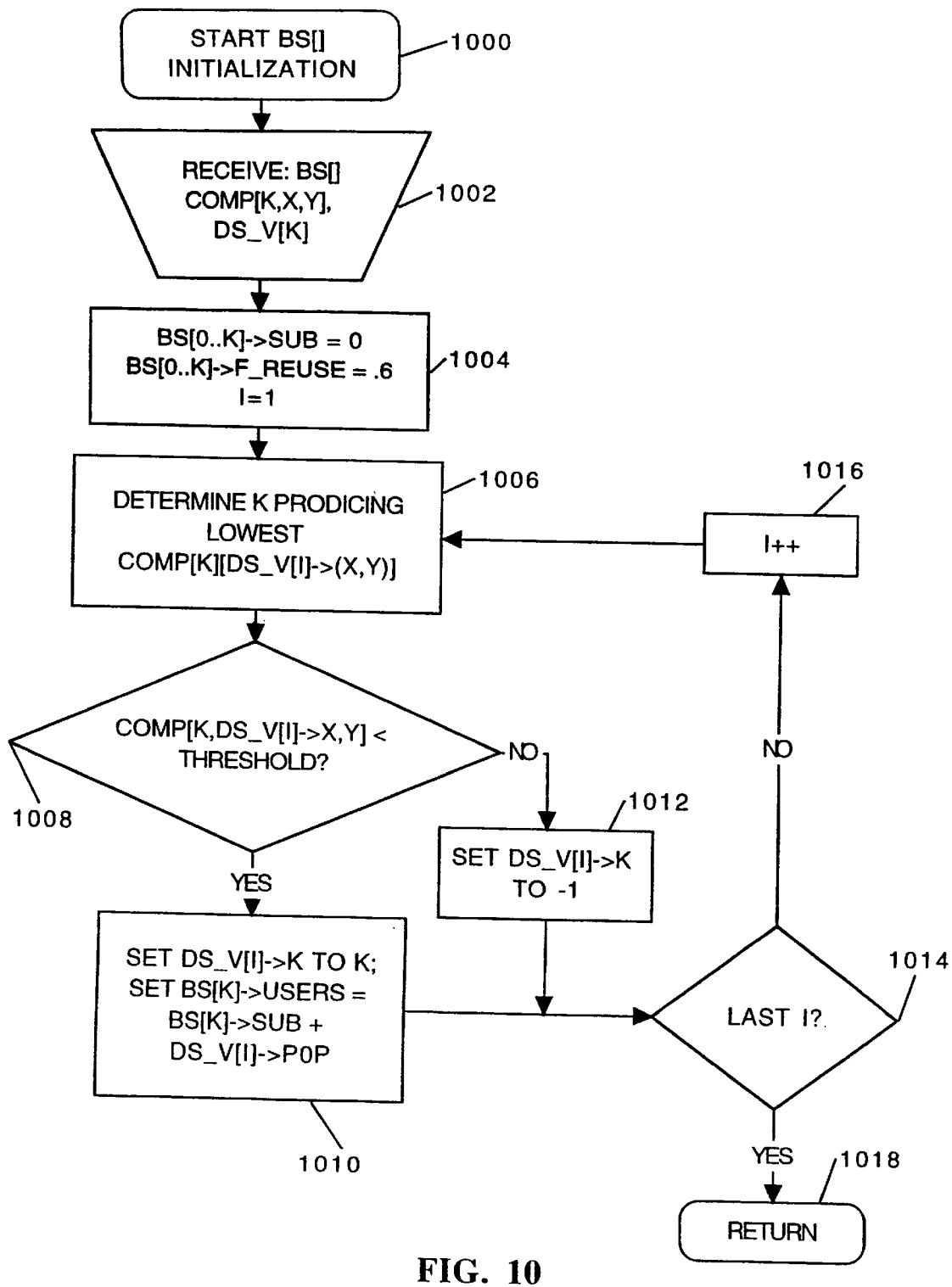
FIG. 10 is a flow chart illustrating the steps performed during initialization of the demand and service vector when performed in accordance with one embodiment of the invention.

In order to start the recursive calculation, it is necessary to place some of the variables involved in the calculation in a starting state. FIG. 10 is a flow diagram illustrating the steps involved with the initialization of the demand and service vector in accordance with one embodiment of the invention. At step 1000 the initialization begins and at step 1002 the demand and service vector, the base station database and the composite propagation loss matrix are received. At step 1004 the number of subscribers (SUB) associated with each base station is set to zero and the frequency reuse (F_REUSE) efficiency associated with each base station is set to 0.6. Additionally the variable I is set to 1. The use of 0.6 is an arbitrary starting point that is adjusted during the subsequent calculations performed. The frequency reuse efficiency is a percentage value indicating frequency reuse losses over the same frequency and it is used during subsequent calculations discussed below. At step 1006 the value K producing the lowest propagation loss from the location referenced by the demand and service vector indexed by the variable I is determined. This corresponds the base station 325 to having the least path loss to the reference location when compared with the other base stations. At step 1008 it is determined whether the path loss associated with the base station 325 is below a certain threshold value that is associated with the maximum path loss a wireless subscriber unit can tolerate given a certain maximum transmit power. This threshold value can be set by the user. If the path loss is less than the threshold the value K is stored in indexed location within the demand and service vector, and the number of subscribers associated with base station K is increased by the population associated with the indexed location at step 1010. If the path loss is more than the threshold, the value −1 is stored in the indexed location at step 1012 indicating no service is provided to the location referenced. At step 1014 it is determined whether the last location in the demand and service vector has been processed and if not the variable I is incremented at step 1016 and step 1006 is performed again. Otherwise the initialization is terminated at step 1018.

Figure 11:
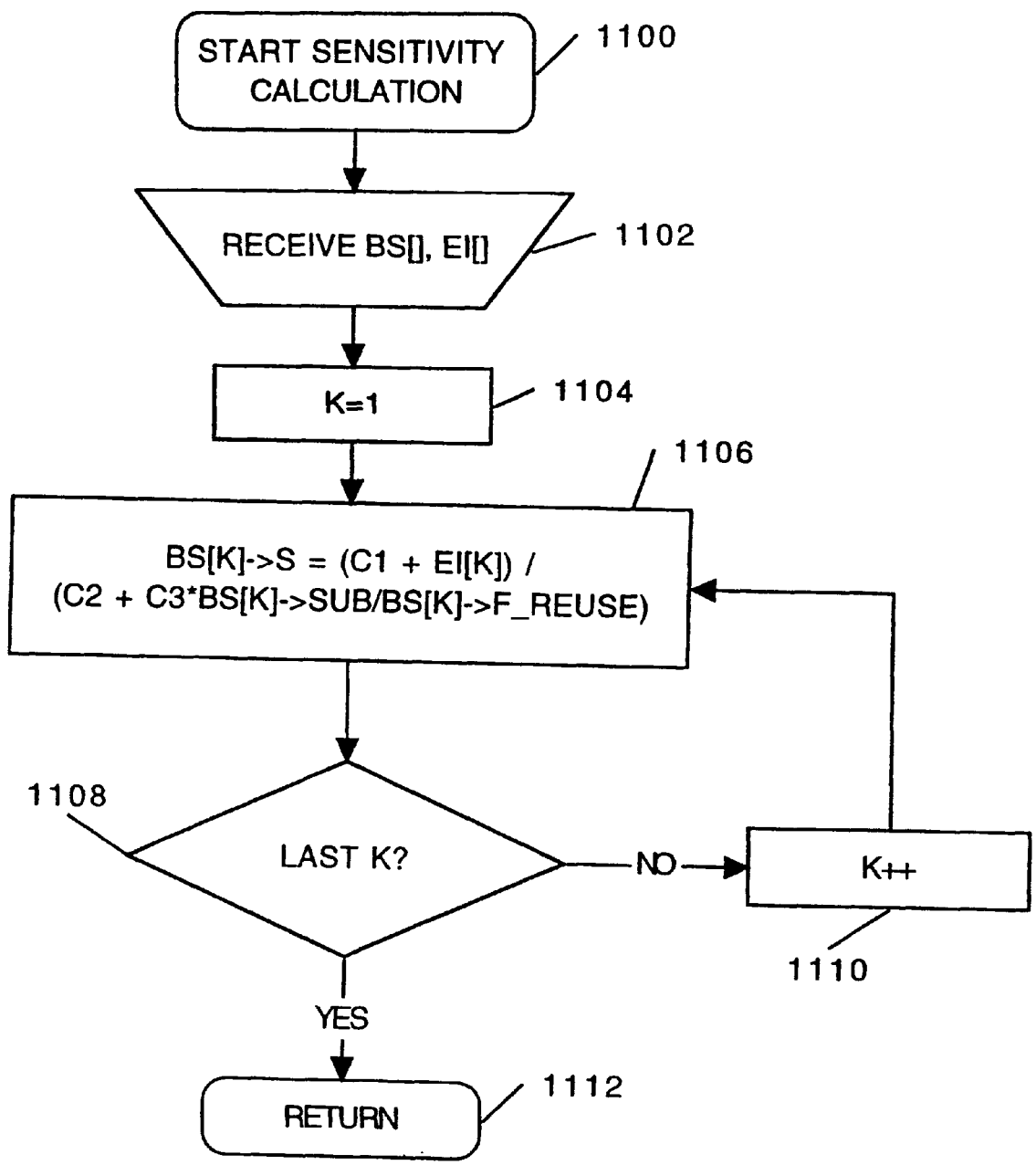
FIG. 11 is a flow chart illustrating the steps performed during calculation of the sensitivity of each based station performed in accordance with one embodiment of the invention.

FIG. 11 is a flow chart illustrating the step involved with the calculation of the sensitivity of each base station in accordance with one embodiment of the invention. As noted above the sensitivity is the minimum CDMA signal strength that can be detected by a base station 325 given the total amount of radio frequency energy being received by the base station 325. At step 1100 the calculation of the sensitivity begins and at step 1102 the list of base stations and interference sources are received. At step 1104 the variable K is set to 1, and at step 1106 the sensitivity (S) of the base station index by the variable K is set to a first constant C1 divided by a second constant C2 plus the number of subscribers associated with the indexed base station divided by the frequency reuse efficiency associated with that base station multiplied by a third constant C3. The calculation performed during step 1106 is derived from equation (3), where $C1 = N_0 W N_f^c(K)$, $$C2 = \dfrac{W/R}{E_b/N_t},$$

and $C3 = v_r$. At step 1108 it is determined whether the last base station has been processed and if not the variable K is incremented at step 1106 is performed again. Otherwise the calculation of the sensitivity of each base station is terminated at step 1112.

After calculating the sensitivity of each base station, the power associated with the reverse link signals transmitted from each location is also calculated. The power associated with the reverse link signals transmitted from each location is referred to as the reverse link effective radiated power (ERP). The reverse link ERP is determined by calculating the level of power at which the reverse link signal must be transmitted in order to having sufficient power to be detected and properly processed at the base station providing service to that location upon the arrival of the reverse link signal. To be detected and properly processed at the base station, the reverse link signal must be received at the base station with an energy equal to at least the sensitivity S(k) of that base station. Determine the amount of transmit power necessary for the reverse link signal transmitted form a particular location to arrive at a base station k with energy equal to S(k) is done by determining the amount of signal loss experienced by that reverse link signal during transmission. This signal loss is a function of the path loss that exists between the location and the base station as well as the antenna gain at both the base station and subscriber unit, and can be expressed as follows:

$$\text{Path Loss} = Gs(k) \cdot L(k, i) \cdot Gb(k, i) \qquad (9)$$

where Gs(k) is the non-direction antenna gain of a subscriber unit situation at the location i being processed, Gb(k, i) is the direction antenna gain at base station k in the direction of location i, and L(k, i) is the propagation loss between base station k and location i as calculated during the generation of the propagation loss matrix described above.

Therefore, the method for calculating the necessary reverse link ERP for a reverse link signal transmitted from a particular location i to base station k to be properly processed is:

$$ERP(k, i) = S(k)/\text{Path Loss} \qquad (10)$$

As noted above, determining the signal loss requires an evaluation of the antenna gain of the base station in the direction of the location being processed. The calculation of such gains is well known in the art. It should also be noted that reverse link effective radiated power differs from the actual power transmitted by a subscriber unit by an adjustment factor $S_{loss}$ where $S_{loss}$ is equal to the amount of signal loss incurred by antenna feeder loss at the subscriber unit. The value $S_{loss}$ is necessary to determine whether a subscriber unit is capable of transmitting a signal with sufficient reverse link ERP.

Figure 12:
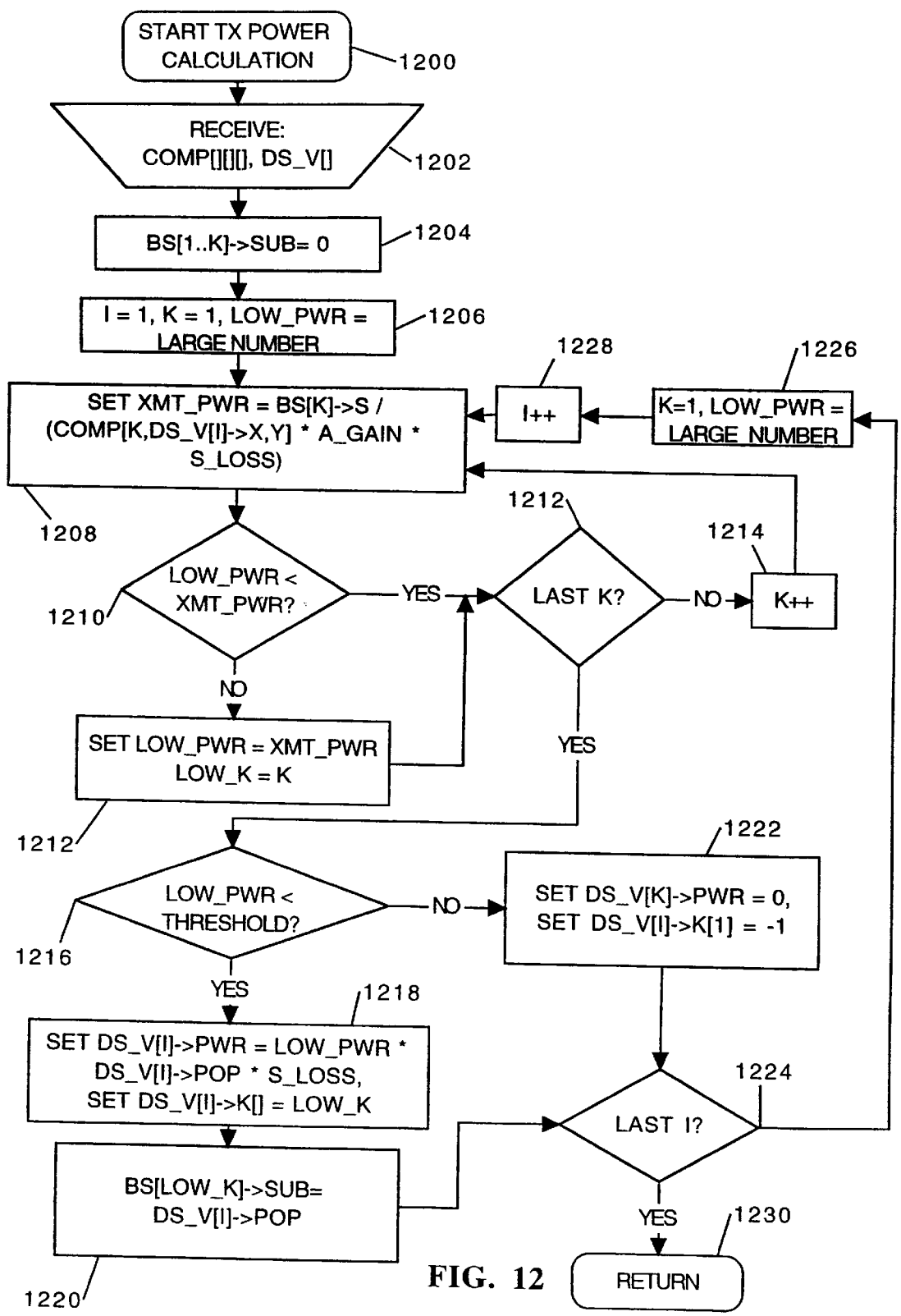
FIG. 12 is a flow chart illustrating the steps performed during calculation of the reverse link effective radiated power from each location in the demand and service vector performed in accordance with one embodiment of the invention.

FIG. 12 is a flow diagram illustrating the steps involved with the calculation of the reverse link effective radiated power due to reverse link signals transmitted from each location within the demand and service vector. At step 1200 the calculation begins, and at step 1202 the base station database and composite propagation loss matrix are received. At step 1204 the number of subscribers in reverse link connection with each base station is initialized to zero, and at step 1206 the variables I and K are set to 1 and the variable LOW_PWR is set to a large number. At step 1208 the a transmit power variable (XMT_PWR) is set equal to the base station sensitivity divided by the path loss from base station K to the location indexed by variable I in the demand and service vector, multiplied by the antenna gain (A_GAIN) and the feeder loss $S_{loss}$ (S_LOSS) in accordance with equation (4), and the use of the feeder loss adjustment. This sets the variable XMT_PWR to the required power at which a reverse link signal from the indexed location within the demand and service vector must be transmitted in order to be properly detected at base station K, adjusted by the feeder loss. At step 1210 it is determined whether the variable LOW_PWR is less the variable XMT_PWR, and if not the variable LOW_PWR is set equal to the variable XMT_PWR and the variable LOW_K is set equal to K. LOW_PWR and LOW_K are used to track the base station to which a reverse link signal can be transmitted from the indexed location using the least amount of transmit power. At step 1212 it is determined whether the last base station has been processed, and if not the variable K is incremented and step 1208 is performed for the next base station. Otherwise, step 1216 is performed.

At step 1216 it is determined whether the variable LOW_PWR is less than a threshold amount that corresponds to the maximum transmit power of a subscriber unit. If so, a subscriber unit at the index location will be able to establish a reverse link connection with the base station indexed by LOW_K, and so the transmitted power associated with the indexed location (DS_V[I]→PWR) is set equal to LOW_PWR adjusted by the feeder loss and the population at the indexed location, and the base station associated with the indexed location (DS_V[I]→K) is set to LOW_K at step 1218. At step 1220 the number of subscriber associated with the base station K is increased by the population associated with the indexed location. If at step 1216 it is determined that LOW_PWR is greater than the threshold, the power generated from the location is set to zero and the base station associated with that location is set to −1 at step 1222 because a subscriber unit at the indexed location will not be able to transmit a reverse link signal with sufficient power to be detected at any base station, and therefore no telecommunications service can be provided at that location. At step 1224 it is determined if the last location I within the demand and service vector has been processed, and if not K is set to 1 and LOW_PWR is set to a large number at step 1226 and I is incremented at set 1228 before step 1208 is performed again. If the last location has been processed then the calculation of the power transmitted from each location in the demand and service vector is terminated at step 1230.

Once the reverse link ERP for each location is calculated the sensitivity of each base station is recalculated using the reverse link ERP. The recalculation is performed by first calculating the power received at each base station from locations within the coverage area of that base station ($P_{in}$), and the power received at each base station from location outside the coverage area of that base station ($P_{out}$). For purposes of the simulation, a location is determined to be within the coverage area of a base station if a reverse link connection from that location has been established with the particular base station in question. Once $P_{in}$ and $P_{out}$ have been determined the frequency reuse efficiency is calculated, and the frequency reuse efficiency used to calculate the sensitivity in accordance with equation (8). Also, the total received power is calculated as being equal $P_{in}$ plus $P_{out}$. In addition to calculating the sensitivity for each base station the load for each base station is also calculated. The load is the ratio of power received from locations within the coverage area of that base station to the total power received. The load is one of the parameters used to determine if convergence has been achieved and that additional iterations of calculation are not necessary.

Figure 13:
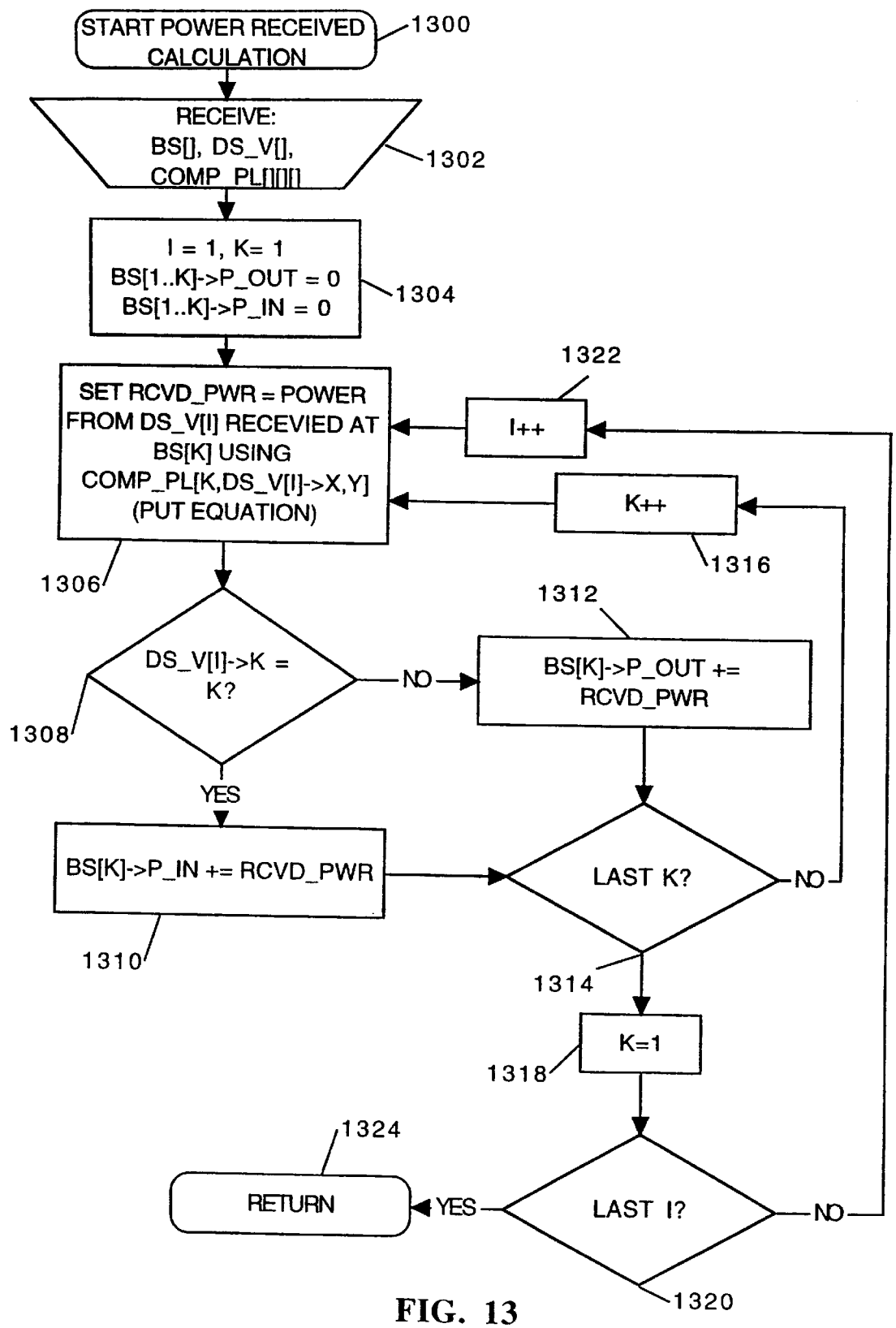
FIG. 13 is a flow chart illustrating the steps performed during calculation of the power received at each base station when performed in accordance with one embodiment of the invention.

FIG. 13 is a flow diagram of the steps involved with the calculation of the total received power at each base station in accordance with one embodiment of the invention. The calculation begins at step 1300, and at step 1302 the base station database, the demand and service vector, and the composite propagation loss matrix are received. At step 1304, the variables I and K are set to one, and the reverse link power from location outside the base station's coverage area (P_OUT) and the reverse link power from locations within the base station's coverage area (P_IN) are initialized to zero. At step 1306 the received power (RCVD_PWR) is set to the reverse link power received at base station K from the location within the demand and service vector indexed by the variable I. At step 1308 it is determined whether the indexed location has established a reverse link connection with base station K, and if so the received power is added to the amount of power received from locations within the base station's coverage area at step 1310. Otherwise the received power is added to the amount of power received from locations outside the base station's coverage area at step 1312. At step 1314 it is determined whether the last base station K has been processed and if not K is incremented at step 1316, and the procedure associated with step 1306 is performed on the next base station. If at step 1314 it is determined that the last base station has been processed, K is set equal to one at step 1318, and at step 1320 is determined if the last location within the demand and service vector has been processed. If not, I is incremented at step 1322 at step 1306 is performed again. If the last location has been processed the calculation of the power received at each base station is terminated at step 1324.

Figure 14:
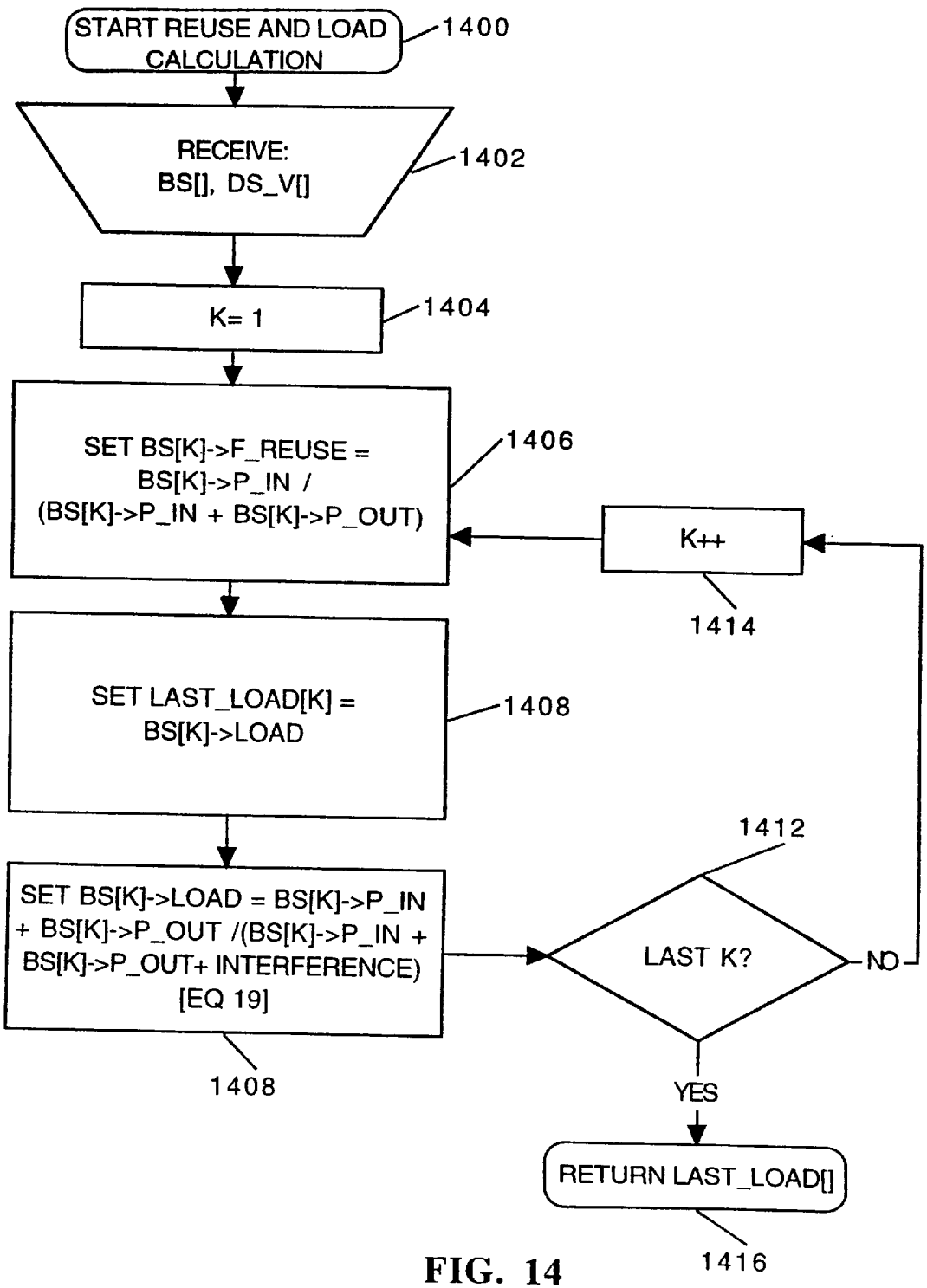
FIG. 14 is a flow chart illustrating the steps performed during calculation of the frequency reuse efficiency performed in accordance with one embodiment of the invention.

FIG. 14 is a flow diagram of the steps involved with the calculation of the frequency reuse efficiency and load calculation for each base station. At step 1400 the calculation begins and at step 1402 the base station database and the demand and service vector are received. At step 1404 the variable K is set equal to one and at step 1404 the frequency reuses efficiency (F_REUSE) for base station K is set to the amount of power received from subscribers within the coverage area of base station K divided by the sum of power received from subscribers within and power received from subscribers outside the coverage area. At step 1408 the load currently associated with base station K is stored in the last load array (LAST_LOAD[ ]) indexed by K, and at step 1410 the load associated with base station K is set to the sum of the power received at the base station from both inside and outside the coverage area, divided by that sum plus the interference received at the base station. At step 1412 it is determined if the last base station has been processed and if not K is incremented at step 1414 and the next base station is processed starting at step 1406. If the last base station has been processed the calculation of the frequency reuse efficiency and load is terminated at step 1416.

Figure 15:
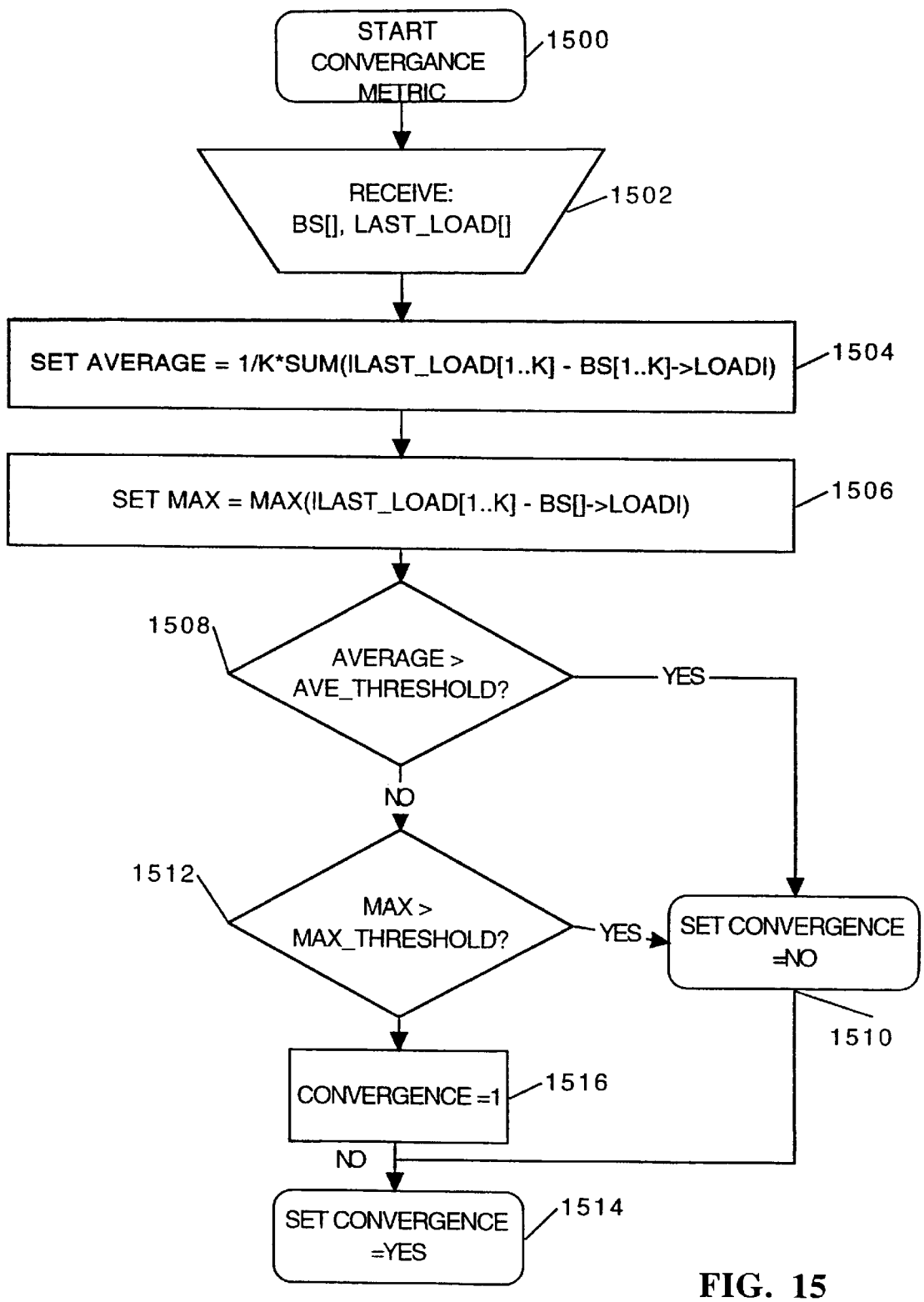
FIG. 15 is a flow chart illustrating the steps performed during calculation of the frequency reuse efficiency performed in accordance with one embodiment of the invention.

FIG. 15 is a flow diagram illustrating the steps involved with the determination of convergence of the reverse link simulation. The determination starts at step 1500 and at step 1502 the base station database and the last load array are received. At step 1504 the variable AVERAGE is set to the average of the absolute value of the differences of the load received by each base station before and after the previous load calculation shown in FIG. 15. At step 1506 the variable MAX is set to the absolute value of the maximum difference between the load received by each base station before and after the previous load calculation. At step 1508 it is determined whether AVERAGE is greater than a value AVE_THRESHOLD, and if so the variable CONVERGENCE is set to zero at step 1510. Otherwise it is determined whether the variable MAX is greater than a value MAX_THRESHOLD, and if so the variable CONVERGENCE is set to zero at step 1510. Otherwise the variable CONVERGENCE is set to one at step 1513. The value CONVERGENCE is then returned at step 1514. Referring back to FIG. 9 we see that is the value CONVERGENCE is zero the reverse link analysis is performed again starting with step 900, and if the variable CONVERGENCE is one the reverse link analysis is terminated at step 918.

In preferred embodiment of the invention other parameters are also used to determine if convergence has been achieved. These parameter include the sensitivity, and the frequency reuse efficiency. These parameters are used in a similar manner to the load to determining convergence with the difference between the average value of the parameters for the last and the next to last iteration being compared, as well as the difference between the maximum and minimum value for the last iteration and the next to last iteration. Additionally, the difference between these values calculated more than one iteration prior to the last iteration are also compared to ensure an oscillating condition has not been achieved.

Referring again to FIG. 4 we see that upon completion of the reverse link analysis at step 408, an analysis of the forward link is performed at step 410. The analysis of the forward link determines the set of locations with which each base station has established a forward link connection. To determine this, the total forward link power received at each location is calculated, and then the set of locations that receive a forward link signal from a base station at sufficient strength to be properly demodulated and processed given the amount of forward link power is also determined. Whether a forward link signal can be properly demodulated and processed is a function of the strength at which the pilot channel associated with that forward link signal is received at the particular location. If the location does received a forward link signal at sufficient strength, a forward link connection is established with the associated base station, and a forward link traffic channel allocated within the forward link signal. The allocation of the traffic channel alters the amount of power associated with the particular forward link signal, which in turn can alter the total forward link power received at each location. Therefore, additional iterations of analysis are performed until a stable result has been achieved, and the analysis has converged.

Figure 16:
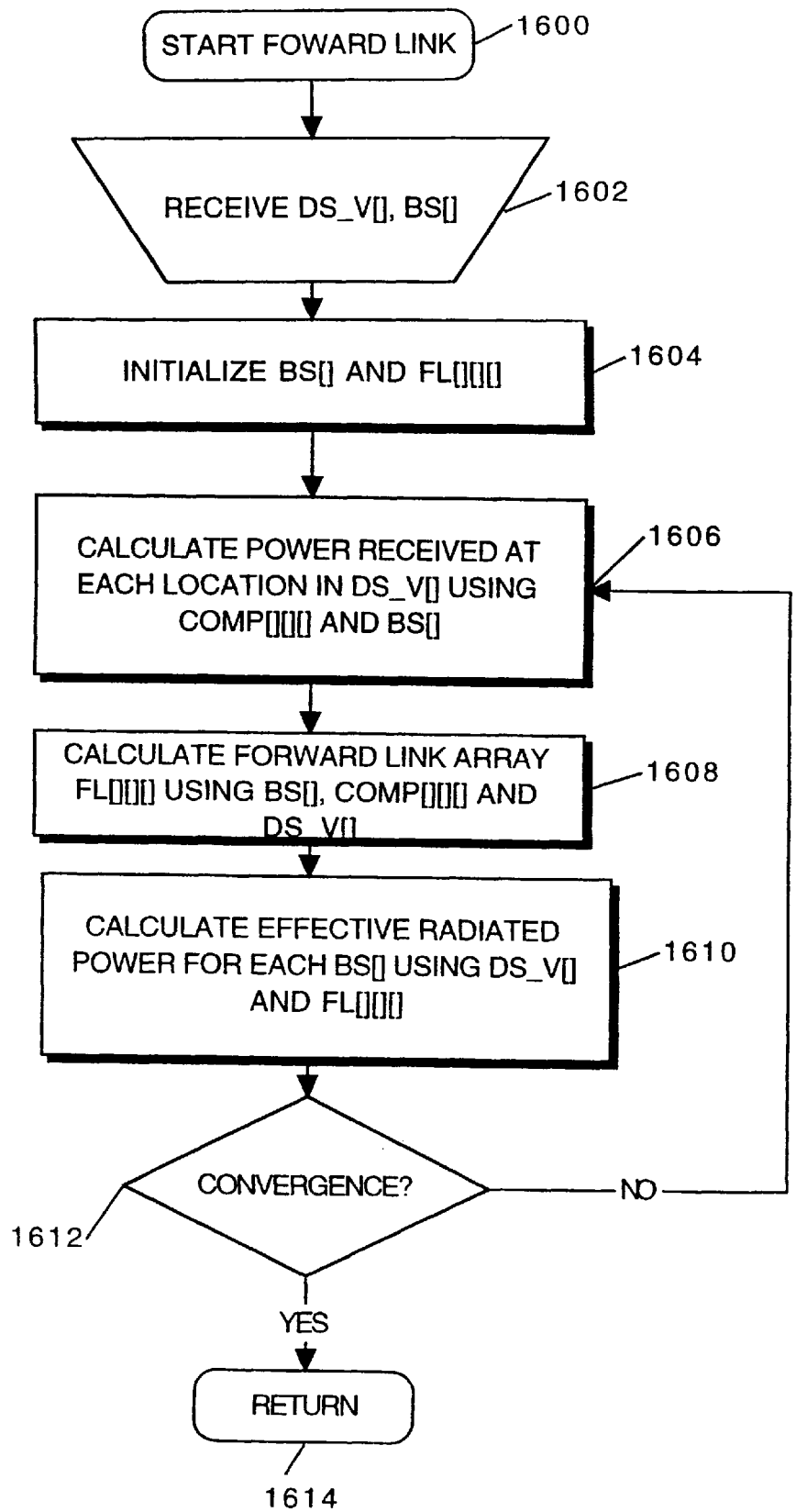
FIG. 16 is a flow chart illustrating the steps performed during the analysis of the forward link performed in accordance with one embodiment of the invention.

FIG. 16 is a flow diagram illustrating the steps involved with the forward link analysis in accordance with one embodiment of the invention. The analysis begins at step 1600 and at step 1602 the base station database, the demand and service vector, and the composite propagation loss matrix are received. At step 1604 the base station database and forward link array (FL[K][X][Y]) are initialized and at step 1606 the power received at each location is the demand and service vector due to any forward link transmission form the set of base stations is calculated using the composite propagation loss matrix ad the base station database. At step 1608 the forward link configuration is calculated using the base station database, the composite propagation loss matrix and the demand and service vector. At step 1610 the effective radiated power generated by each base station is calculated using the base station database, the demand and service vector, and the forward link array, and at step 1612 it is determined whether convergence has been achieved in the analysis. If not step 1606 is performed again. Otherwise the forward link analysis is terminated at step 1614.

In order to properly understand the forward link analysis some of the assumptions made during the course of the analysis must be described. The power associated with a forward link signal is a function of the number of channels being transmitted via that forward link signal, and the amount of power associated with each channel. As noted above the channels transmitted via the forward link signal include the pilot channel, the synchronization channel, the paging channel and a set of traffic channels, and therefore the power associated with a forward link signal will be the sum of the power associated with these channels. As also noted above, traffic channels generally carry voice data and therefore the power associated with a traffic channel is a function of the voice activity. The same voice activity factor $v_r$ use for the reverse channel is also used for the forward link traffic channel plus an additional quantity for control data also carried by the forward link traffic channel which in the preferred embodiment of the invention is equal to 0.09 of the due to the traffic data alone.

Channel gains and power weights are used to determined the portion of the forward link signal that is due to each particular type of channel, and therefore the strength of that channel when received at a particular location within the demand and service vector. Each shared power channel over the forward link is defined in terms of a predetermined analog gain factor Ga, a predetermined channel digital gain factor Wn, a predetermined channel power weighting factor W and a predetermined channel data rate. An exemplary digital gain $G_{channel}$ is a 7-bit digit from 0 to 127 whose square is proportional to the power transmitted per channel. A weighting factor $W_{channel}$ describes the maximum fraction of total power assigned to each channel.

The pilot channel is used as a coherent carrier reference for demodulation by all subscriber receivers and is transmitted by each sector of a base station. Primarily, this channel provides a means for subscriber units to acquire timing and tracking information of a particular sector. It is transmitted at higher power level than other channels. The sync channel provides the subscriber receivers with system parameters during the signal acquisition by the subscriber from the base station. An exemplary sync channel operates at a fixed data rate of 1200 bps and provides timing information and the paging channel data rate. An exemplary use of the synchronization channel is to convey system parameters and base station messages to the subscriber units when in idol mode. An exemplary paging channel data rate may operate at 2400, 4800 or 9600 bps and from 1 to 7 channels may be assigned for each single CDMA frequency assignment. Each call in progress is assigned a unique traffic channel by the base station. In an exemplary configuration, each CDMA frequency allows a user to communicate over one of 62 available traffic channels. An exemplary traffic channel transmits data at 1200, 2400, 4800 or 9600 bps depending on their voice activity $v_r$, as previously explained.

Additionally, the power associated with each traffic channel may be adjusted via the use of a second power control loop. If a location receives the pilot channel at sufficient power to properly process and demodulate the pilot signal a traffic channel is allocated. If the traffic channel is then received with insufficient power to be properly processed and demodulated at the location, the power of the traffic channel is increased until it can be properly processed, or a maximum power level has been reached.

Figure 17:
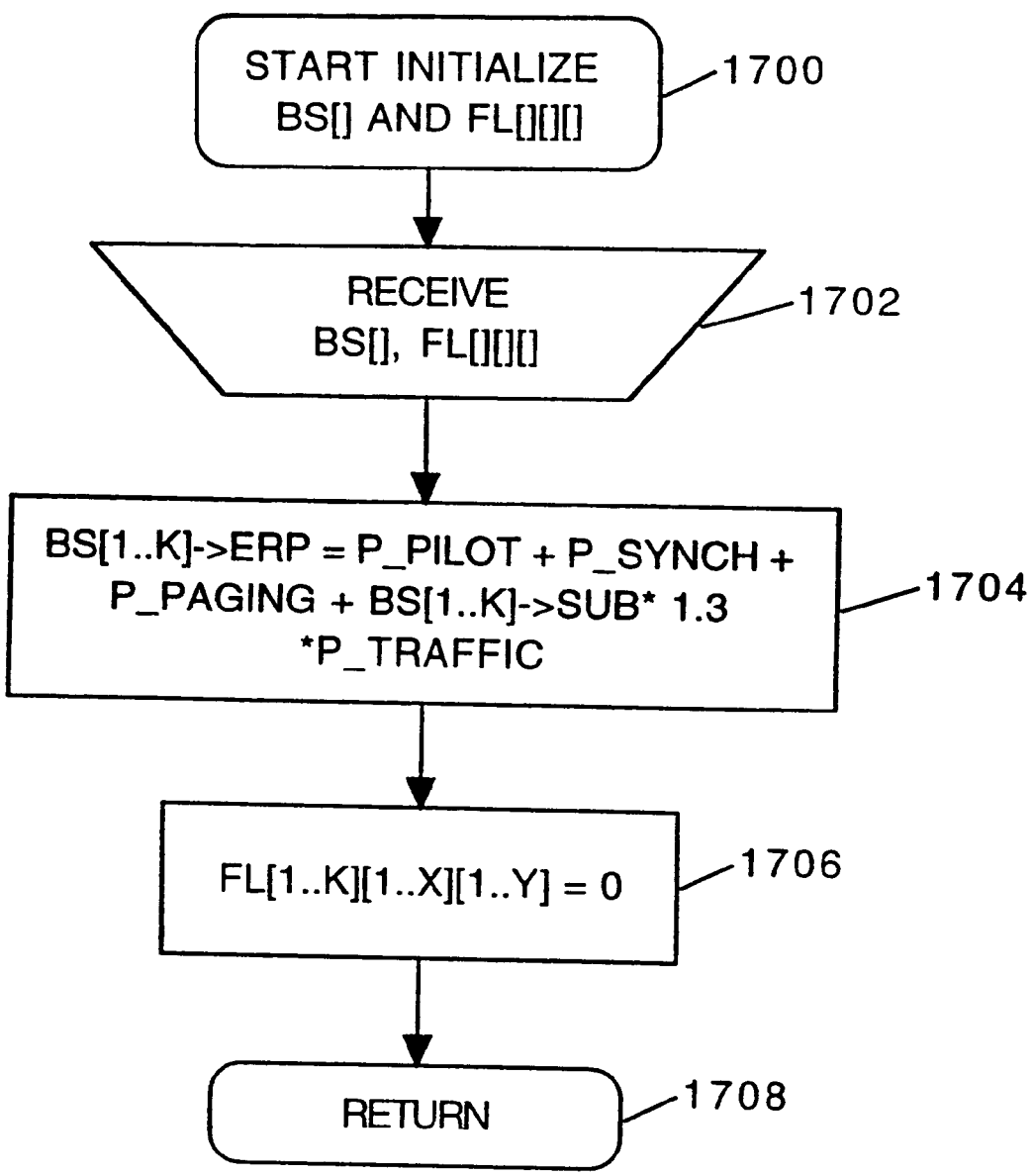
FIG. 17 is a flow chart illustrating the steps performed during initialization of the base station database and the forward link array when performed in accordance with one embodiment of the invention.

In order to speed up the forward link analysis, initial values are provided of the forward link ERP from each base station, and a set of forward link connections are established using the reverse link determined during the reverse link analysis. A location that is engaged in a reverse link connection with a base station will necessarily be engaged in a forward link connection. FIG. 17 is a flow diagram of the steps involved with the initialization of the base station database and the forward link array. The initialization begins at step 1700 and at step 1702 the base station database and the forward link array are received. At step 1704 the effective radiated power (ERP) from each base station is set to the sum of pilot channel power (P_PILOT), the synchronization channel power (P_SYNC), the paging channel power (P_PAGING), and the traffic channel power (P_TRAFFIC) multiplied by the number of reverse link subscribers and a factor of 1.3. Since the power associated with the forward link signal will be equal to the power associated with the sum of the channels carried by the forward link signal, the calculation performed in step 1704 will provide the effective radiated power of a particular base station. During this initialization it is assumed that the number of traffic channels equals the number of reverse links established with the base station multiplied by 1.3 which is a reasonable assumption for purposes of initialization since each subscriber unit have a reverse link connection must also have a forward link connection and many subscriber units will also be in soft hand off and therefore be assigned traffic channels in the forward link signals from multiple base stations. At step 1706 all the locations within the forward link array are set to zero, and at step 1708 the initialization is terminated.

Once the forward link ERP for each base station is set, the forward link power received at each location is determined. The forward link power received at each location is the sum of the forward link power received at the location from each base station, where the forward link power received at the location a base station is equal to the forward link ERP from that base station adjusted by the amount of signal loss experienced during transmission of the forward link signal. The signal loss is calculated as listed above with respect to the reverse link analysis using the composite propagation loss matrix loss adjusted be the antenna gain at both the base station and at a subscriber unit situated at the location being processed.

Figure 18:
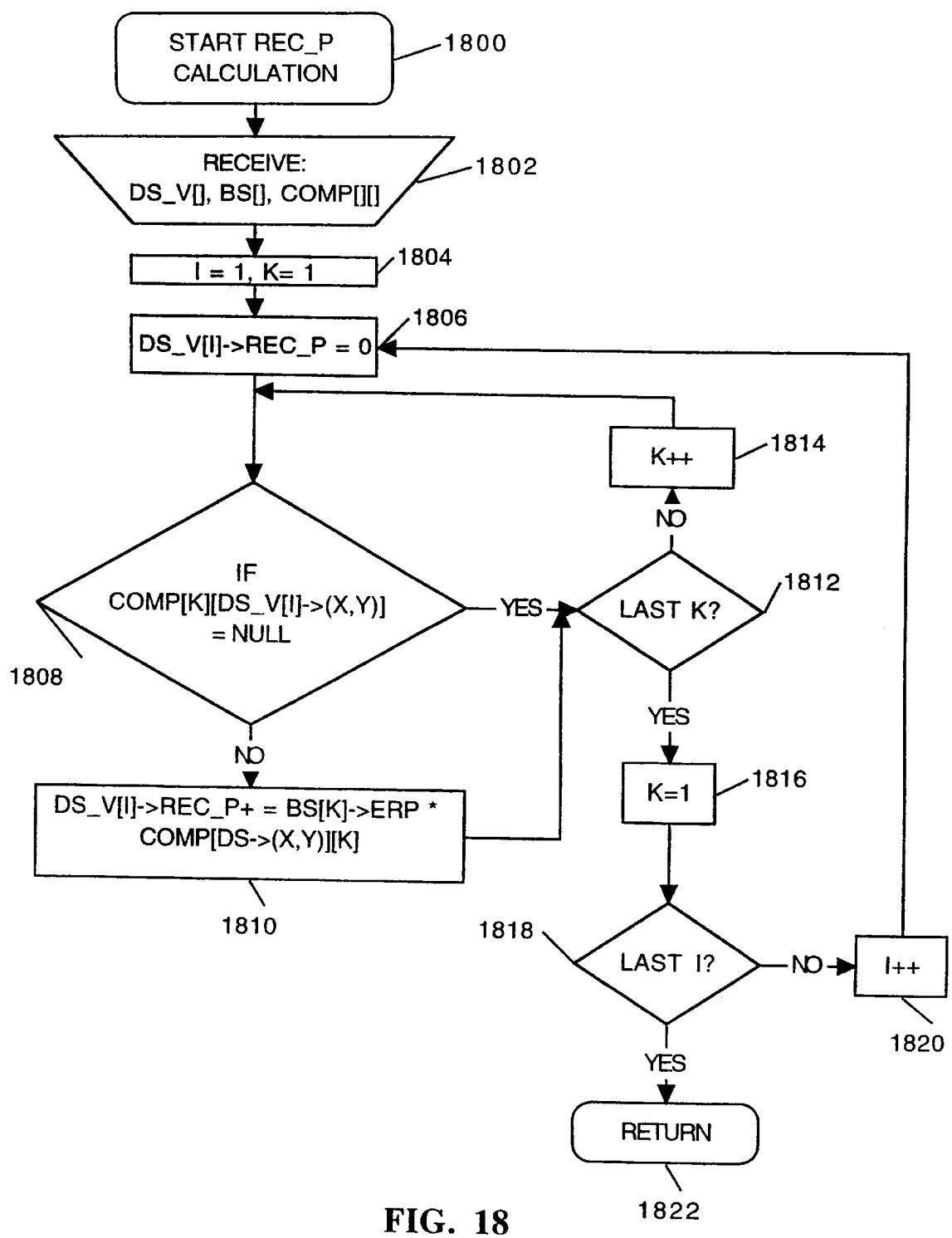
FIG. 18 is a flow chart illustrating the steps performed during calculation of the forward link power received at each location when performed in accordance with one embodiment of the invention.

FIG. 18 is a flow diagram illustrated the steps involved with the calculation of the power received from each base station at each location within the demand and service vector. The calculation begins at step 1800 and at step 1802 the demand and service vector, the base station database, and the composite propagation loss matrix are received. At step 1804 the variable I, and K are set to one and at step 1806 the received power (REC_P) associated with the indexed location in the demand and service is set to zero. At step 1808 it is determined if the location within the composite propagation loss matrix indexed by K and the coordinate of the demand and service vector indexed by I is equal to NULL, and if not, the power received at the indexed location is increased by the effective radiated power of the base station multiplied by the path loss between the indexed location and the base station times the direction antenna gain at the base station in the direction of the location being processed, multiplied by the non directional subscriber antenna gain. This yields the power received at that location due to the forward link signal from that base station. The calculation of the power received at each location is then continued at step 1812. If at step 1808 it is determined that the location within the composite propagation loss matrix indexed by K and the coordinate of the demand and service vector indexed by I is equal to NULL, the location and the base station are located sufficiently far away that no propagation loss was calculated during the generation of the composite propagation loss matrix, and therefore an insignificant amount of energy will be received from that base station. Therefore, the calculation of the power received at each location is proceeds directly to step 1812. At step 1812 it is determined whether the last base station has been processed, and if not K is incremented at step 1814 and step 1808 is performed again. If the last base station has been processed at step 1812 K is set to one at step 1816 and at step 1818 it is determined whether the last location within the demand and service vector has been processed and if not I is incremented at step 1820 and step 1906 is performed again. If the last location has been processed the calculation of the power received at each location is terminated at step 1822.

Once the forward link power received at each base station is calculated, the set of locations with which each base station establishes a forward link connection is determined. As noted above, a forward link connection can be established when a pilot signal is received at the location with sufficient strength to be properly processed by a subscriber unit situated at that location given the total forward link power received at that location.

Figure 19:
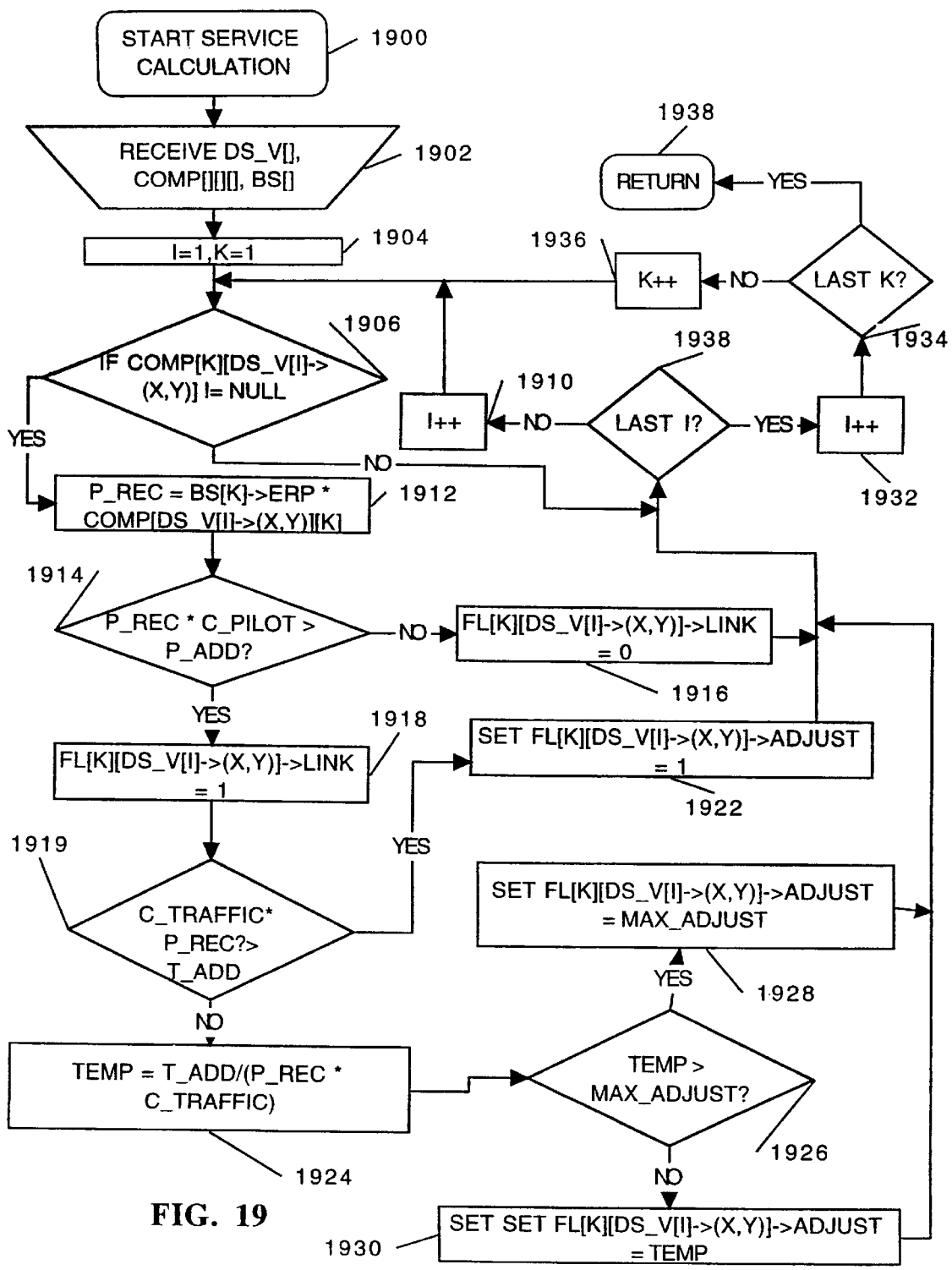
FIG. 19 is a flow chart illustrating the steps performed during calculation of the forward link effective radiated power from each base station when performed in accordance with one embodiment of the invention.

FIG. 19 is a flow diagram of the steps involved with the calculation of the forward link service provided at each location by each base station in accordance with one embodiment of the invention. The calculation begins at step 1900 and at step 1902 the demand and service vector, the composite propagation loss matrix, and the base station database are received. At step 1904 the variables I and K are set to 1 and at step 1906 it is determined whether the composite propagation loss matrix indexed by K and the location in the demand and service vector indexed by I is equal to NULL, and if so it is determined at step 1908 whether the last location has been processed and if not I is incremented at step 1910 and step 1906 is performed on the next location. If the composite propagation loss matrix indexed by K and the location in the demand and service vector indexed by I is not equal to NULL the variable P_REC is set to the effective radiated power from the base station database indexed by K multiplied by the composite propagation loss and the antenna gain (A_GAIN) at step 1912. The antenna gain is the combination of the directional antenna gain at the base station and the non-directional antenna gain of a subscriber unit situation at the location being processed. At step 1914 it is determined whether the variable P_REC multiplied by a pilot constant (C_PILOT) and divided by the total energy received at the location being processed is greater than a constant P_ADD. The pilot constant is the portion of power associated with the forward link signal from base station K due to the pilot channel. The constant P_ADD is the amount by which the power associated with the pilot channel must exceed the total power received at the location in order to be properly processed. If the determination performed at step 1914 is negative, the link value (LINK) in the forward link array indexed by K and the demand and service vector index by I is set to zero at step 1916, indicating the pilot signal is not received with sufficient strength and that no forward link has been established between base station K and location I, and then step 1908 is performed. If the determination performed at step 1914 is positive, the link value within the forward link array is set to one at step 1918 indicating a forward link between base station K and location I has been established.

At step 1920 it is determined whether the variable P_REC multiplied by a traffic channel constant (C_TRAFFIC) is greater than the value T_ADD. The traffic channel constant is the portion of power associated with the forward link signal from base station K due to the pilot channel. If the test performed at step 1920 is positive the adjust value (ADJUST) associated with forward link is set to one at step 1922 and step 1908 is performed. The constant T_ADD is the amount by which the power associated with the traffic channel must exceed the total power received at the location in order to be properly processed. If the test performed at step 1920 is negative, indicated that the traffic channel is not received with sufficient strength, the value TEMP is set to the value T_ADD multiplied by the total power received at the location being processed, and divided by the power received multiplied by the traffic constant at step 1924. At step 1926 it is then determined if TEMP is greater than a maximum adjust (MAX_ADJUST) value. The maximum adjust value is the maximum amount the power associated with a traffic channel can be increased. If TEMP is greater than the maximum adjust value the adjust value associated with the forward link is set to MAX_VALUE at step 1928. Otherwise the adjust value associated with the forward link is set to TEMP at step 1930. The adjust value is the amount by which the power of the traffic channel may be adjusted so as to be properly modulated and processed at the location being processed. At step 1908 it is determined whether the last location within the demand and service vector has been processed, and if so I is set to one at step 1932, and at step 1934 it is determined if the last base station has been processed. If not K is incremented at set 1936 and step 1906 is performed. Otherwise the calculation of the forward link service provided by each base station is terminated at step 1938.

Figure 20:
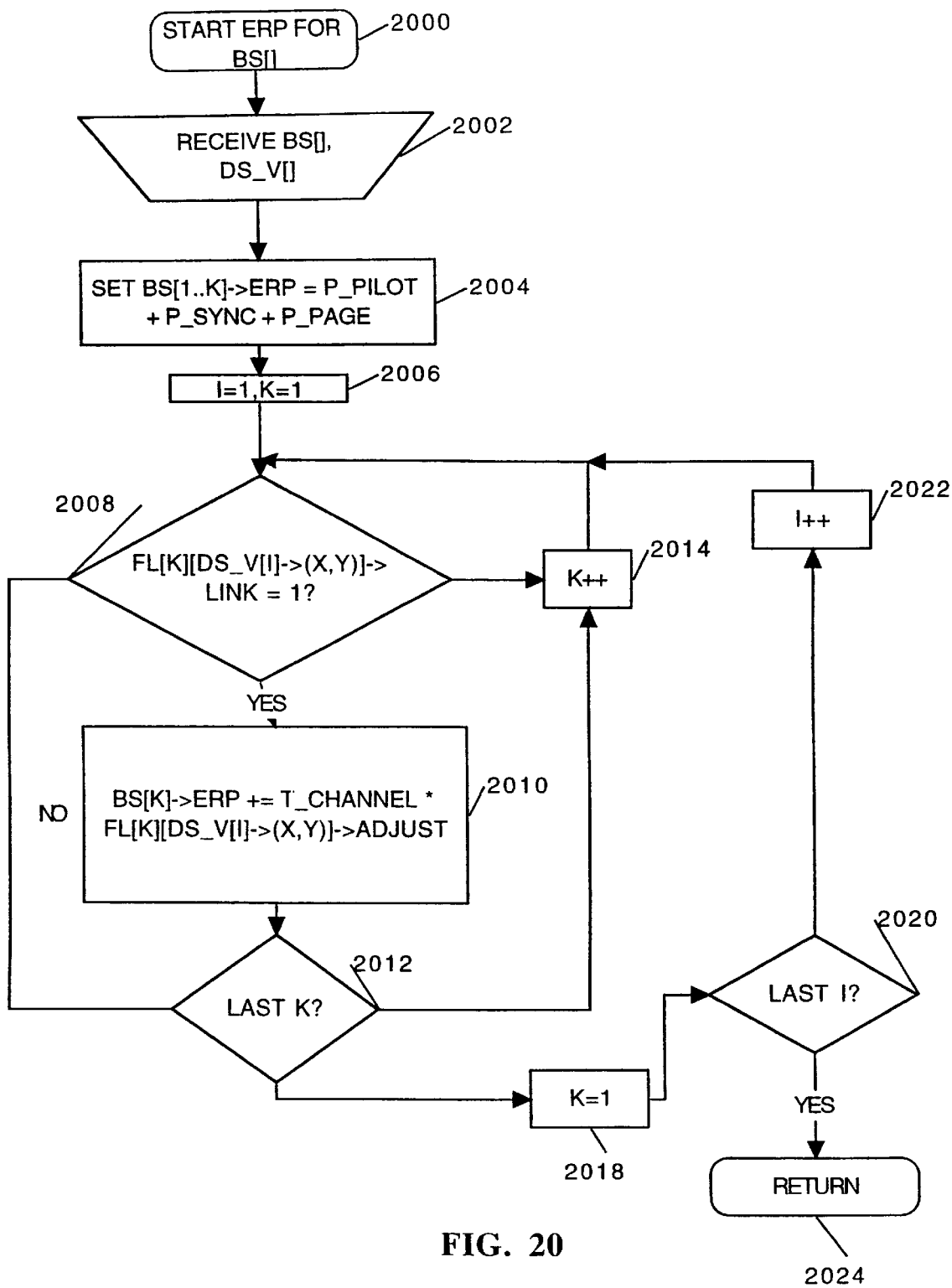
FIG. 20 is a flow chart illustrating the steps performed during calculation of the forward link service provided by each base station performed in accordance with one embodiment of the invention.

Once the number of forward link connections established by each base station is determined, as well as the power adjustment factors associated with each forward link traffic channel, the forward link ERP for each base station can then be recalculated. FIG. 20 is a flow diagram illustrating the steps involved with the calculation of the effective radiated power from each base station in accordance with one embodiment of the invention. The calculation starts at step 2000 and at step 2002 the base station database and the demand and service vector are received. At step 2006 the effective radiated power for each base station is set to the sum of the pilot channel power, the synchronization channel power, and the paging channel power, which are predetermined values. At step 2006 the variables I and K are set to one. At step 2008 it is determined if the forward link array indexed by K and the coordinates of the demand and service vector indexed by I is equal to one. If so, a forward link exists from the indexed location within the demand and service vector to base station K, and at step 2010 the effective radiated power from base station K is increased by an amount equal to the power associated with a traffic channel plus the adjust factor stored in the forward link array. The adjust factor is an amount by which the power associated with a traffic channel is increased to ensure a subscriber unit receives the forward link signal if it is in a particular noisy location. If it is determined at step 2008 that no forward link signal exists between base station K and location, step 2010 is skipped and step 2012 is performed. At step 2012 is determined if the last base station has been processed, and if not K is incremented at step 2014 and step 2008 is performed on the next base station. If the last base station has been processed, K is set to one at step 2018 and it is determined at step 2020 if the last location within the demand and service vector has been processed. If not I is incremented at step 2022 and step 2008 is performed on the next location within the demand and service vector. If the last location has been processed, the calculation of the effective radiated power for each base station is terminated at step 2024.

Referring again to FIG. 16 upon calculating the forward link effective radiated power for each base station it is determined at step 1612 whether convergence has been achieved. This is accomplish in a similar manner as that for the reverse link with the difference in the average as well as the separation of the maximum and minimum of various parameters being calculated and compared to some threshold value. In one embodiment of the invention the parameters used for such determination include the number of forward link traffic channels established by each base station, the forward link ERP for each base station, and the forward link power received at each location. If it is determined at step 1612 that convergence has not been achieved, the analysis of the forward link continues at step 1606. If it is determined at step 1612 that convergence has been achieved, the analysis of the forward link is terminated at step 1614.

Referring again to FIG. 6, upon completion of the forward link analysis at step 610 the results of the simulation are displayed at step 612. In accordance with one embodiment of the invention the results may be continuously displayed in a variety of manners via manipulation of the menu bar 10? And input of various parameters via the use of dialog boxes at described above until such display is not longer desired and the network planning is then terminated at step 614. Additionally, the results of the simulation may be saved or stored in non-volatile memory 208 for recall and display at some later time without the need to perform the network simulation as described above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A wireless network planning tool for simulating the operation of a wireless telephone system that utilizes code division multiple access radio frequency signal modulation comprising:

a memory system for storing terrain data, population data, and base station configuration data, as well as a set of software instructions;

a processing system for generating a path loss matrix and demand and service information using said terrain data, population data, and base station configuration data in response to said set of software instructions;

a display system for displaying said demand and service information;

wherein said wireless telephone system uses a frequency re-use pattern of 1;

said demand and service information is comprised of:
 a set of locations from said terrain data;
 a set of base stations from said base station configuration data and a corresponding set of base station locations: and
 a set of reverse link connections between said set of locations and said set of base stations, said reverse link including transmissions on a single frequency.

2. The wireless network planning tool as set forth in claim 1 wherein said demand and service information further comprises a set or forward link connections between said set of locations and said set of base stations.

3. The wireless network planning tool as set forth in claim 2 wherein said demand and service information further comprises:
 a set of forward link radiated power levels corresponding to said set of forward link connections.

4. The wireless network planning tool as set forth in claim 2 wherein said demand and service information further comprises:

a sensitivity for each base station in said set of base stations;

a received forward link power for each location in said set of locations; and an indication as to whether each location is engaged in multiple forward link connections.

5. The wireless network planning tool as set forth in claim 2 wherein said demand and service information further comprises:
 a set of traffic channels associated with each forward link connection.

6. The wireless network planning tool as set forth in claim 5 wherein said demand and service information further comprises:
 a set of adjust values corresponding to said set of traffic channels.

7. The wireless network planning tool as set forth in claim 1 further comprising an input means for entering said set of base station locations into said memory system.

8. The wireless network planning tool as set forth in claim 1 wherein said demand and service information further comprises:
 a set of reverse link radiated power levels corresponding to said set of reverse link connections.

* * * * *